US011586628B2

(12) United States Patent
Bansal et al.

(10) Patent No.: US 11,586,628 B2
(45) **Date of Patent: *Feb. 21, 2023**

(54) METADATA DRIVEN DATASET MANAGEMENT

(71) Applicant: salesforce.com, inc., San Francisco, CA (US)

(72) Inventors: Kaushal Bansal, Pleasanton, CA (US); Venkata Muralidhar Tejomurtula, Danville, CA (US); Azeem Feroz, San Jose, CA (US); Dmytro Kashyn, Holliston, MA (US); Dmytro Kudriavtsev, Belmont, CA (US); Shouzhong Shi, San Jose, CA (US); Ajitesh Jain, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 172 days.

This patent is subject to a terminal disclaimer.

(21) Appl. No.: 17/099,478

(22) Filed: Nov. 16, 2020

(65) Prior Publication Data

US 2021/0073220 A1 Mar. 11, 2021

Related U.S. Application Data

(63) Continuation of application No. 15/828,118, filed on Nov. 30, 2017, now Pat. No. 10,838,962.

(51) Int. Cl.
*G06F 16/2457* (2019.01)
*G06F 16/2455* (2019.01)
(Continued)

(52) U.S. Cl.
CPC ...... *G06F 16/2455* (2019.01); *G06F 16/2228* (2019.01); *G06F 16/24578* (2019.01);
(Continued)

(58) Field of Classification Search
CPC ............. G06F 16/2228; G06F 16/2455; G06F 16/24578; G06F 16/252; G06F 16/81; G06Q 30/01
See application file for complete search history.

(56) References Cited

U.S. PATENT DOCUMENTS 7,730,478 B2 6/2010 Weissman
7,779,039 B2 8/2010 Weissman et al.
(Continued)

OTHER PUBLICATIONS

Non-Final Office Action, U.S. Appl. No. 15/844,311, dated Apr. 9, 2020, 9 pages.
(Continued)

*Primary Examiner* — Robert W Beausoliel, Jr.
*Assistant Examiner* — Nirav K Khakhar
(74) *Attorney, Agent, or Firm* — Nicholson, De Vos, Webster & Elliott, LLP

(57) ABSTRACT

A method for configuring the operation of the software of a data as a service (DAAS) system during run time is described. The configuring includes at least one of configuring ingestion of a vendor dataset to produce an ingested dataset and which analysis operations to perform on the vendor dataset to produce an analyzed dataset, and the configuring also includes at least one of how to search the vendor dataset based on a search query from a customer to allow the customer to locate a new record from the vendor dataset and how to match records in the vendor dataset with a match query from the customer to provide an updated record to the customer.

22 Claims, 16 Drawing Sheets

(51) Int. Cl.

| | |
|---|---|
| ***G06Q 30/01*** | (2023.01) |
| ***G06F 16/22*** | (2019.01) |
| ***G06F 16/81*** | (2019.01) |
| ***G06F 16/25*** | (2019.01) |

(52) U.S. Cl.

CPC ............ *G06F 16/252* (2019.01); *G06F 16/81* (2019.01); *G06Q 30/01* (2013.01)

(56) References Cited

U.S. PATENT DOCUMENTS

| | | | |
|---|---|---|---|
| 9,245,145 | B2 | 1/2016 | Wo et al. |
| 9,378,263 | B2 | 6/2016 | Khimich et al. |
| 9,979,587 | B2 | 5/2018 | Tejomurtula et al. |
| 10,097,667 | B2 | 10/2018 | Wo et al. |
| 10,152,497 | B2 | 12/2018 | Doan et al. |
| 10,191,939 | B2 | 1/2019 | Malygin et al. |
| 10,445,062 | B2 | 10/2019 | Oberbreckling et al. |
| 2012/0143819 | A1 | 6/2012 | Tan |
| 2013/0275363 | A1 | 10/2013 | Wu et al. |
| 2013/0339366 | A1 | 12/2013 | Khimich et al. |
| 2013/0339490 | A1 | 12/2013 | Tejomurtula et al. |
| 2014/0019488 | A1 | 1/2014 | Wo et al. |
| 2015/0039649 | A1 | 2/2015 | Andrews et al. |
| 2015/0058422 | A1 | 2/2015 | Malygin et al. |
| 2016/0112538 | A1 | 4/2016 | Wo et al. |
| 2016/0255139 | A1 | 9/2016 | Rathod |
| 2017/0242868 | A1 | 8/2017 | Doan et al. |
| 2017/0242891 | A1 | 8/2017 | Doan et al. |
| 2017/0286441 | A1 | 10/2017 | Doan et al. |
| 2018/0165281 | A1 | 6/2018 | Jagota et al. |
| 2018/0165294 | A1 | 6/2018 | Jagota et al. |
| 2018/0165354 | A1 | 6/2018 | Jagota et al. |
| 2018/0357443 | A1 | 12/2018 | Joscelyne et al. |
| 2018/0373732 | A1 | 12/2018 | Jagota et al. |
| 2019/0155938 | A1 | 5/2019 | Kudriavtsev et al. |
| 2019/0163786 | A1 | 5/2019 | Bansal et al. |
| 2019/0188313 | A1 | 6/2019 | Bansal et al. |
| 2019/0230081 | A1 | 7/2019 | Singh et al. |
| 2019/0230169 | A1 | 7/2019 | Elangovan et al. |
| 2019/0236178 | A1 | 8/2019 | Jagota et al. |
| 2019/0236460 | A1 | 8/2019 | Jagota et al. |
| 2020/0042626 | A1 | 2/2020 | Curtis et al. |

OTHER PUBLICATIONS

Non-Final Office Action, U.S. Appl. No. 15/844,311, dated Dec. 23, 2019, 10 pages.

Non-Final Office Action, U.S. Appl. No. 15/828,118, dated Jan. 16, 2020, 18 pages.

Notice of Allowance, U.S. Appl. No. 15/828,118, dated Jul. 22, 2020, 8 pages.

Notice of Allowance, U.S. Appl. No. 15/844,311, dated Aug. 20, 2020, 09 pages.

Supplemental Notice of Allowability, U.S. Appl. No. 15/828,118, dated Oct. 20, 2020, 2 pages.

212

```
<?xml version="1.0" encoding="UTF-8"?>
<DataAnalysisDictionary>
    <analyzers>
```

500A

```
        <name>Analyzer1</name>
        <analyzed indexed="true" stored="false" fieldType="string"></analyzer>
```

500B

```
        <name>Analyzer2</name>
        <analyzed indexed="false" stored="true" fieldType="string"></analyzer>
```

500C

```
        <name>Analyzer3</name>
        <normalizer>
            <name>xxxClassifier</name>
            <indexed>true</indexed>
            <stored>false</stored>
        </normalizer>
```

500D

```
        <name>Analyzer4</name>
        <normalizer>
            <name>yyyClassifier</name>
            <indexed>false</indexed>
            <stored>true</stored>
        </normalizer>
```

500E

```
        <name>Analyzer5</name>
        <normalizer>
            <name>zzzClassifier</name>
            <indexed>false</indexed>
            <stored>false</stored>
            <analyzed name="text_stem" indexed="true" stored="false"></analyzed>
        </normalizer>
    </analyzers>
</DataAnalysisDictionary>
```

```
<?xml version="1.0" encoding="UTF-8"?>
<sourceMetadata>
    <name>VENDOR-1</name>
    <type>COMPANY</type>
    <dataSet>
    <delimiter>,</delimiter>
    <prevalidateFull>true</prevalidateFull>
    </dataSet>
    <columnDefinition>
        <column>
            <name>Company Name</name>
            <externalName>CompanyName</externalName>
            <description></description>
            <mappedTo>COMPANY_NAME</mappedTo>
            <analyzer>Analyzer4</analyzer>
        </column>
    </columnDefinition>
</sourceMetadata>
```

901A
```
<index Name = "DOMAIN_COUNTRY">
        <normalizers>
                <normalizer Field = "DOMAIN" class="IndexDomainNormalizer" />
                <normalizer Field = "COUNTRY" class = "PlainNormalizer" />
        </normalizers>
        <weight>100</weight>
</index>
```

901B
```
<index Name = "DOMAIN">
        <normalizers>
                <normalizer Field = "DOMAIN" class="IndexDomainNormalizer" />
        </normalizers>
        <weight>1</weight>
</index>
```

FIG. 9

```
<field>
    <name>Street_Number</name>         1103
    <threshold>100</threshold>         1105
    <methods>
        <method>exact match</method>
    </methods>
</field>                               1101
```

```
<field>
    <name>Street_Name</name>           1203
    <threshold>90</threshold>          1205
    <methods>
        <method>edit distance</method>
    </methods>
</field>                               1201
```

128

```xml
<rankDefinition>
    <matchScoreFields>
        <matchScoreField>
            <name>Street_Number.MatchScore</name>
            <weight>100</weight>
        </matchScoreField>
        <matchScoreField>
            <name>Street_Name.MatchScore</name>
            <weight>1000</weight>
        </matchScoreField>
    </matchScoreFields>
    <non-matchScoreFields>
        <non-matchScoreField>
            <name>isHQ</name>
            <weight>10000</weight>
        </non-matchScoreField>
        <non-matchScoreField>
            <name>isBranch</name>
            <weight>100</weight>
        </non-matchScoreField>
    </non-matchScoreFields>
    <scoreRatio>0.75</scoreRatio>
</rankDefinition>
```

FIG. 14

METADATA DRIVEN DATASET MANAGEMENT

CROSS-REFERENCE TO RELATED APPLICATIONS

This application is a continuation of U.S. patent application Ser. No. 15/828,118, filed Nov. 30, 2017 (now U.S. Pat. No. 10,838,962, issued Nov. 17, 2020), which is hereby incorporated by reference.

TECHNICAL FIELD

One or more implementations relate to the field of data ingestion, analysis, and querying; and more specifically, to utilizing metadata at run time of a data as a service ("DaaS" or "DAAS") system for configuration of ingesting, analyzing, indexing, and querying vendor datasets to provide records to customers.

BACKGROUND

In the context of a DAAS system, a vendor may provide a vendor dataset for ingestion into the DAAS system using vendor-specific configuration information. In this example, ingestion is performed on the vendor dataset by an ingestion service that is configured according to the vendor-specific configuration information. For ingestion, the vendor-specific configuration information may include information describing the structure of the vendor dataset that may be used by the DAAS to validate the vendor dataset and support retrieving records from the vendor dataset in support of match and search services (e.g., locating records in the vendor dataset based on search and match queries to import new records into a customer system or import updated records into a customer system).

The vendor dataset may also be optionally analyzed by the DAAS system to produce an analyzed dataset using vendor-specific configuration information that configures an analysis service. This analysis may include analysis operations performed on the vendor dataset after ingestion and indicated in the vendor-specific configuration information (in other words, the vendor-specific configuration information may also include indications of which analysis operations to perform). The analyzed dataset produced by this analysis is used by a search service for allowing customers to perform search queries to import records from the vendor dataset.

The vendor dataset may also be optionally indexed by the DAAS system to produce an indexed dataset using vendor-specific configuration information that configures an indexing service. The indexing may be performed based on match keys specified in the vendor-specific configuration information. The indexed dataset may support performance of match queries to match records of records already imported into customer systems with potentially updated versions in the vendor dataset by a match service. The match service may be configured to support match queries using the vendor-specific configuration information, which includes indications of the match keys to generate for a corresponding match query, match rules to perform the match query, and indications of weights to apply to perform ranking of results of the match query.

Traditionally, vendor-specific configuration information for dataset ingestion, analysis, indexing, and querying must be setup prior to running the DAAS system. In this fashion, the vendor-specific configuration information, including information describing the structure of the vendor dataset, indications of which analysis operations to perform, indications of fields to generate the set of match keys to generate, indications of match rules to apply, and indications of weights to apply, is determined and used to configure the DAAS system prior to compilation and running of the DAAS system. However, this technique is inefficient as it requires recompilation and redistribution of the DAAS system software, including the ingestion service, the analysis service, the indexing service, and the match service for any updates to the vendor-specific configuration information.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 6 shows an example of a data analysis dictionary comprising an analysis type according to one example implementation.

FIG. 7 shows ingestion/search metadata, including ingestion metadata and search metadata, according to one example implementation.

FIG. 9 shows an example of match key metadata according to one example implementation.

FIG. 14 shows ranking metadata according to one example implementation.

DETAILED DESCRIPTION

Figure 1:
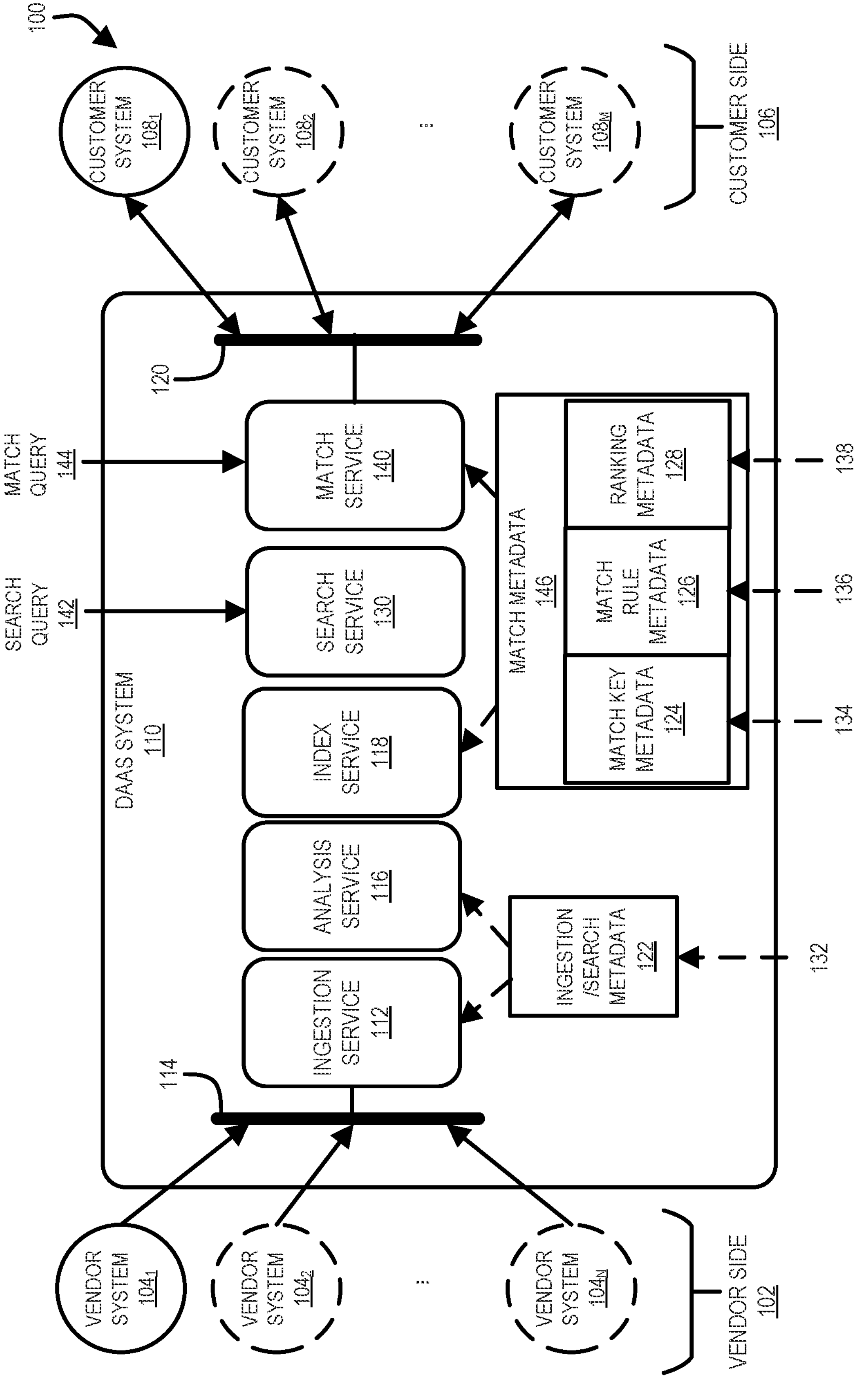
FIG. 1 shows a block diagram of a DAAS architecture that provides on-demand data services according to one example implementation.

FIG. 1 is a block diagram of a DAAS architecture 100 that provides on-demand data services according to one example implementation. FIG. 1 divides the DAAS architecture 100 into three portions: a vendor side 102, including a set of vendor systems $\mathbf{104}_1$-$\mathbf{104}_N$ (where N is greater than or equal to one); a customer side 106, including a set of customer systems $\mathbf{108}_1$-$\mathbf{108}_M$ (where M is greater than or equal to one); and a DAAS system 110. In this configuration, the vendor systems 104 may provide vendor datasets that are ingested, analyzed, and/or indexed by the DAAS system 110. The DAAS system 110 may thereafter use these ingested, analyzed, and/or indexed datasets available to the customer systems 108 for querying and importing desired records into databases of the customer systems 108. This querying and importation may be performed based on (1) a search query 142 that seeks to provide a customer system 108 with new records from a vendor dataset for importation and/or (2) a match query 144 that seeks to provide a customer system 108 with updates to records already imported into the customer system 108. For example, a vendor, using one of the vendor systems 104, may provide to the DAAS system 110 a vendor dataset related to business leads. The vendor dataset, which may be transformed via an ingestion service 112 to produce an ingested dataset, via an analysis service 116 to produce an analyzed dataset, and/or via an index service 116 to produce an indexed dataset, is stored and persisted in one or more databases. A customer, using one of the customer systems 108 and having contracted with an administrator of the DAAS system 110, may request the DAAS system 110 to query one or more vendor datasets for business leads that meet the customer's purposes (e.g., leads related to the sale of office equipment). The DAAS system 110 comprises software running on hardware as described in more detail below.

To improve the production of a query result by the DAAS system 110, the vendor datasets provided by the vendor systems 104 may need to be ingested using a particular set of field mappings for verification purposes; analyzed using a particular ordered set of one or more analysis operations for use when applying a search query 142; and processed using a particular set of match keys, match rules, and weights when applying a match query 144. This improvement may include one or more of improving the accuracy, efficiency, and speed of producing a query result for both search queries 142 and match queries 144. In some implementations, fine-tuning the ingestion, analysis, indexing, and querying (for both search queries 142 and match queries 144) to maintain or realize this improvement may be an iterative or continually changing procedure. As used herein, "accurate query result" refers to the provision of the data, from data managed by the DAAS system 110, that most closely aligns with a corresponding search query 142 and/or match query 144. The use of the ingestion/search metadata 122 and the match metadata 146 allows the ingestion service 112, the analysis service 116, the index service 118, the search service 130, and/or the match service 140 to be configured and/or reconfigured during run time of the DAAS system 110. In other words, the ingestion/search metadata 122 and/or the match metadata 146, including one or more of the match key metadata 124, the match rule metadata 126, and the ranking metadata 128, may be altered (as illustrated by the dashed lines 132, 134, 136, and 138, respectively) during run time of the DAAS system 110, thereby altering the ways in which vendor datasets are ingested, analyzed, indexed, and/or queried (for both search queries 142 and match queries 144) by the DAAS system 110 during run time of the DAAS system 110. Accordingly, through the use of the ingestion/search metadata 122 and/or the match metadata 146 that is used during run time, configuration of ingestion, analysis, indexing, and/or querying (for both search queries 142 and match queries 144) may be adjusted without recompilation and redistribution of the DAAS system 110 software, including the ingestion service 112, the analysis service 116, the indexing service 118, the search service 130, and the match service 140. In this fashion, the DAAS system 110, including the ingestion service 112, the analysis service 116, the indexing service 118, the search service 130, and the match service 140, may, and at times will, remain unchanged (e.g., does not require recompilation and redistribution) but ingestion of vendor datasets, analysis of vendor datasets, indexing of vendor datasets, and/or querying of vendor datasets will be altered via modifications to the ingestion/search metadata 122 and/or the match metadata 146. This improves the efficiency (e.g., the speed, cost, etc.) with which the configuration of the ingestion service 112, the analysis service 116, the index service 119, the search service 130, and/or the match service 140 may be improved, which improves the production of a query result (for both search queries 142 and match queries 144) by the DAAS system 110 (e.g., adjustments may be made quickly and less expensively responsive to discovering better configurations that require less storage, require less processing, produce more accurate query results, and/or improve the speed with which a query result can be generated). In particular, through the use of the ingestion/search metadata 122 and/or the match metadata 146 the DAAS system 110 may easily ingest, analyze, index, and query data from various vendors with corresponding different data configurations (e.g., use of different field names) that may be configured to map to structures understood within the DAAS system 110 (e.g., mapping of field names in the vendor datasets to fields of the DAAS system 110).

In some implementations, the DAAS system 110 may be a multi-tenant system. As a multi-tenant DAAS system, it may include a single instance of each of the ingestion service 112, the analysis service 116, and the index service 118 that may be accessed by multiple vendor systems 104 (also known as tenants) and each vendor system 104 is provided with a dedicated share of a software instance of each of the ingestion service 112, the analysis service 116, and the index service 118. Similarly, the DAAS system 110 may include a single instance of each of the search service 130 and/or the match service 140 that may be accessed by multiple vendor systems 104 and each vendor system 104 is provided with a dedicated share of a software instance of each of the search service 130 and/or the match service 140. In this multi-tenant DAAS system 110, the ingestion/search metadata 122 and the match metadata 146, including the match key metadata 124, the match rule metadata 126, and/or the ranking metadata 128, may be used for configuring one or more of the shares of the software instances of the ingestion service 112, the analysis service 116, the index service 118, the search service 130, and/or the match service 140 (e.g., in a multi-tenant DAAS system, configuring a share of the ingestion service 112, a share of the analysis service 116, a share of the index service 118, a share of the search service 130, and/or a share of the match service 140 specifically for each vendor based on that vendor's specific configuration information).

In other implementations, the DAAS system 110 may be a single-tenant system. As a single-tenant system, the ingestion/search metadata 122 and/or the match metadata 146 may be used for configuring the ingestion service 112, the analysis service 116, the index service 118, the search service 130, and/or the match service 140 in a similar fashion as described above in relation to the DAAS system 110 operating as a multi-tenant system. Accordingly, the implementation of the DAAS system 110 as a multi-tenant or single-tenant system does not alter the functionality of the DAAS system 110 and associated components described herein.

Figure 2:
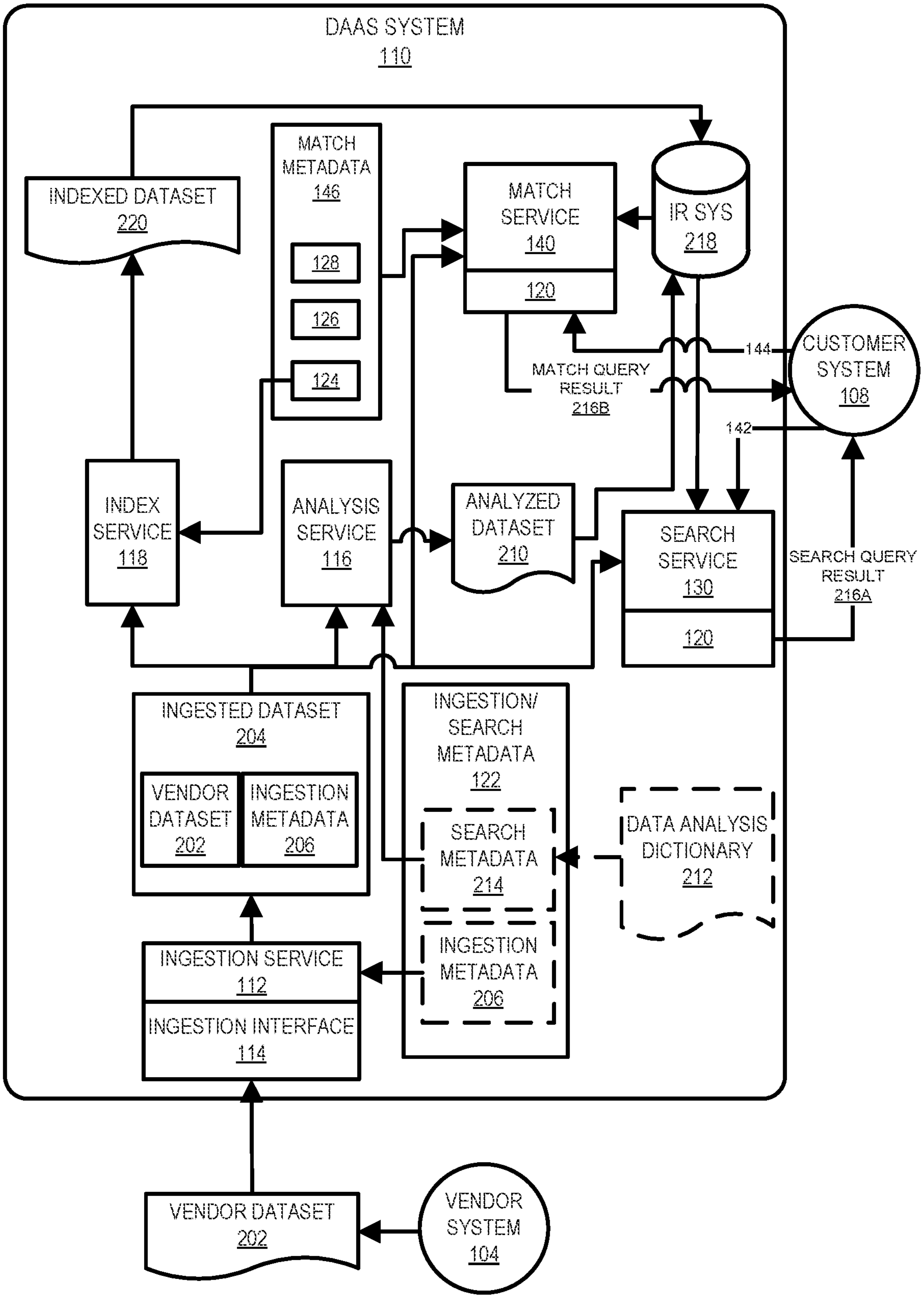
FIG. 2 shows a more detailed block diagram of a DAAS system that has metadata driven ingestion, analysis, indexing, and querying according to one example implementation.

FIG. 2 shows a more detailed block diagram of a DAAS system 110 that has metadata driven ingestion, analysis, indexing, and querying (for both search queries 142 and match queries 144) according to one example implementation. As shown in FIG. 2, the DAAS system 110 receives, via the ingestion interface 114, a vendor dataset 202 for ingestion by the ingestion service 112 to produce an ingested dataset 204. In one implementation a vendor dataset 202 comprises data stored in one or more fields of one or more data structures, and each of these fields may or may not be defined within the DAAS system 110. The ingestion metadata 206 (e.g., the entirety or a portion of the ingestion/search metadata 122) includes mappings of fields used within the vendor dataset 202 to fields defined within the DAAS system 110. In one implementation, the mappings included within the ingestion metadata 206 may be used by the ingestion service 112 to verify that the structure of the vendor dataset 202 (e.g., the set of fields in the vendor dataset 202) complies with a structure agreed on between a vendor of the vendor system 104 providing the vendor dataset 202 to the DAAS system 110 and an administrator of the DAAS system 110. The ingested dataset 204 may be a combination of the vendor dataset 202 and the ingestion metadata 206. The ingested dataset, including the vendor dataset 202 and the ingestion metadata 206, may be later used by various other components of the DAAS system 110 (e.g., the analysis service 116, the index service 118, the search service 130, and/or the match service 140) for accessing data from the vendor dataset 202 (e.g., for cross-referencing records in the vendor dataset 202 with records in a dataset generated based on the vendor dataset 202). In some implementations, the ingestion interface 114 may permit a vendor system 104 to deliver a vendor dataset 202 to the DAAS system 110 for ingestion over a network. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data (e.g., a vendor dataset 202) from a vendor system 104 to the DAAS system 110. In some implementations, the ingestion interface 114 may utilize a File Transfer Protocol (FTP), a Network File System (NFS), or a similar protocol/system.

In one implementation, the vendor dataset 202, provided by the vendor system 104 and associated with a vendor, may include any set of data and may be represented in any format. In one implementation, the vendor dataset 202 may be vendor data that is intended to be made accessible to one or more of the customers and/or customer systems 108. For example, the vendor dataset 202 may include company and contact information for a set of business leads and may be represented in a flat database structure. In this flat database structure, the vendor dataset 202 may be represented in a single table (or database object) or as a single data record, which is separated by delimiters, such as tabs or commas (e.g., Comma-Separated Values (CSV) or JavaScript Object Notation (JSON) file). In other implementations, the vendor dataset 202 may be provided as a set of relational database tables (or database objects) or in another type of database structure or data format.

In some implementations, the ingestion metadata 206 may be a portion of the ingestion/search metadata 122. For example, a portion of the ingestion/search metadata 122 (e.g., the ingestion metadata 206) may be used for configuring the ingestion service 112 and later used by the analysis service 116, the index service 118, the search service 130, and the match service 140 for accessing data within the vendor dataset 202 while another portion of the ingestion/search metadata 122 (e.g., the search metadata 214) may be used for configuring the analysis service 116. In other implementations, the ingestion/search metadata 122 may be entirely composed of the ingestion metadata 206 or entirely composed of the search metadata 214.

In some implementations, the mappings, defined by the ingestion metadata 206, between fields of the vendor dataset 202 and fields of the DAAS system 110 may be determined in several different ways. For example, the ingestion metadata 206, defining the mappings, may be generated (1) manually based on inputs from a vendor associated with the vendor system 104 and/or a representative of the DAAS system 110 (e.g., inputs received via an Application Programming Interface (API) and/or a Graphical User Interface (GUI)); (2) automatically (e.g., determining ingestion metadata 206 by mapping fields of a vendor dataset 202 to fields defined within the DAAS system 110 that share similar names, including through the use of machine learning algorithms); and/or (3) a combination of manual input and automation. For example, in response to not receiving or locating ingestion metadata 206 associated with a vendor dataset 202, the DAAS system 110 may be triggered to automatically generate ingestion metadata 206 for the vendor dataset 202. In this implementation, the DAAS system 110 may utilize machine learning to automatically generate ingestion metadata 206 for the vendor dataset 202 based on field names or field values of the vendor dataset 202. The automatically generated ingestion metadata 206 may be later modified by a vendor associated with the vendor system 104 and/or a representative of the DAAS system 110.

As noted above, the ingestion metadata 206 may be specific for or associated with each vendor system 104 and/or each vendor and may be used at run time of the DAAS system 110 for configuring the DAAS system 110 to generate the ingested dataset 204 and later used by the analysis service 116, the index service 118, the search service 130, and the match service 140 for accessing data within the vendor dataset 202. By using the ingestion metadata 206 at run time, the process of ingesting a vendor dataset 202 and accessing the vendor dataset 202 may be adjusted without a need for recompilation and redistribution of the DAAS system 110 software, including the ingestion service 112, the analysis service 116, the index service 118, the search service 130, and the match service 140.

Following generation of the ingested dataset 204, which may be comprised of the vendor dataset 202 and the ingestion metadata 206, the ingested dataset 204 may be stored (e.g., in direct pipeline storage) pending further processing by the DAAS system 110.

The ingested dataset 204 may be received and analyzed by an analysis service 116. More specifically, the vendor dataset 202 within the ingested dataset 202 may be analyzed (based on mappings in the ingestion metadata 206) using an ordered set of one or more analysis operations that are referenced in search metadata 214 (e.g., the entirety or a portion of the ingestion/search metadata 122). These analysis operations place the vendor dataset 202, that is part of the ingested dataset 204, in a form that will produce improved search query results 216A for the customer systems 108 than the vendor dataset 202 on its own.

The search metadata 214 may indicate the ordered set of one or more analysis operations to be performed differently in different implementations (e.g., implementations may support indicating the analysis operations individually, using one or more "analysis types," or indicating one or more of the set individually and the rest using one or more "analysis types"). In an implementation that supports analysis types, each "analysis type" identifies an ordered set of one or more analysis operations. While different implementations may store this information differently, in one implementation that supports analysis types, the different analysis types are defined in a data analysis dictionary 212. For example, an analysis type, in the data analysis dictionary 212, may be defined by an ordered set of analysis operations that are associated with an identifier. For instance, a first ordered set of analysis operations define a first analysis type associated with a first identifier and a second ordered set of analysis operations define a second analysis type associated with a second identifier. In this example implementation, the search metadata 214 may reference the first identifier to perform the first ordered set of analysis operations on a field of the vendor dataset 202 and/or may reference the second identifier to perform the second ordered set of analysis operations on another field of the vendor dataset 202. Accordingly, the analysis types act as shorthand to reference an ordered set of analysis operations.

As noted above, the analysis types may be defined in a data analysis dictionary 212. The data analysis dictionary 212 may be determined based on inputs from a vendor associated with the vendor system 104 and/or a representative of the DAAS system 110 (e.g., inputs received via an API and/or a GUI during run time of the DAAS system 110). The data analysis dictionary 212 may be specific for or associated with each vendor system 104 and/or each vendor. Thus, in such an implementation, one may create an analysis type in the data analysis dictionary 212, and then one may refer to that analysis type in search metadata 214, and this reference in the search metadata 214 is converted into the ordered set of analysis operations by the analysis service 116.

The analysis operations used by the analysis service 116 may involve various transformations and actions to be performed on the vendor dataset 202 to generate an analyzed dataset 210. In one implementation: 1) the vendor dataset 202 comprises data stored in one or more fields of one or more data structures; 2) the analysis service 116 uses the search metadata 214 (e.g., the entirety or a portion of the ingestion/search metadata 122), which identifies an ordered set of analysis operations to be performed on the vendor dataset 202, to produce the analyzed dataset 210; 3) the analyzed dataset 210 comprises data stored in one or more fields of one or more data structures; and 4) the fields of the analyzed dataset 210 may include additional fields (as described below) not found in the vendor dataset 202 and/or not include some fields found in the vendor dataset 202.

After the analyzed dataset 210 has been generated, it is stored in the info retrieval system 218 and the search service 130 may provide mechanisms to provide search query results 216A to customer systems 108 and customers responsive to receiving a communication from customer systems 108 (e.g., a search query 142; responsive to a user interacting with a GUI on a device in communication with an application provided in the cloud, the application generates the search query 142). As shown in FIG. 2, the search query result 216A may be provided to consumer systems 108 via the serving interface 120. In some implementations, the serving interface 120 may provide the search query result 216A over a network. The network may comply with one or more network protocols, including an IEEE protocol, a 3GPP protocol, or similar wired and/or wireless protocols, and may include one or more intermediary devices for routing data from the DAAS system 110 to a customer system 108. In some implementations, the serving interface 120 may utilize a FTP, a NFS, or a similar protocol/system.

Figure 3:
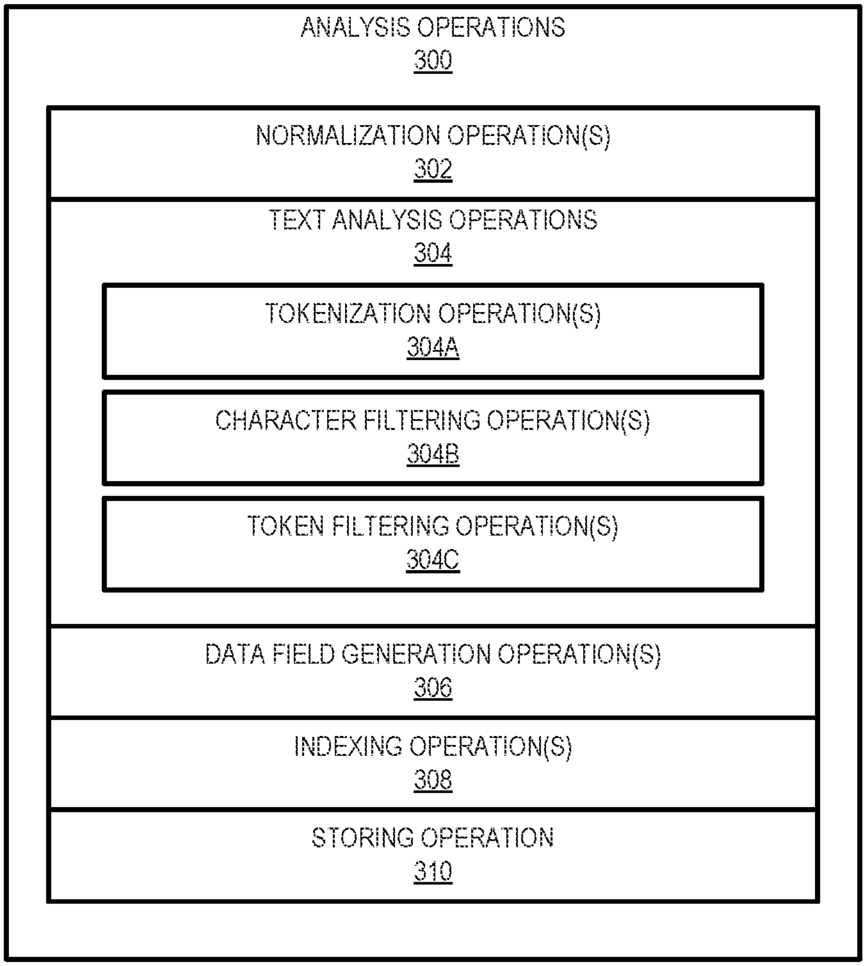
FIG. 3 shows a set of analysis operations according to one example implementation.

FIG. 3 shows a set of analysis operations 300 according to one example implementation. As shown in FIG. 3, the analysis operations 300 may include one or more normalization operations 302 to be performed on a vendor dataset 202. Normalization may remove data redundancy in a vendor dataset 202 and thereby simplify the design of the vendor dataset 202. In some implementations, the normalization operations may include one or more of first through sixth normalization operations, a Boyce-Codd normalization operation, or a similar normalization operation.

In one implementation, the analysis operations 300 may additionally or alternatively include one or more text analysis operations 304. The text analysis operations 304 may include one or more tokenization operations 304A to be performed on a vendor dataset 202. In some implementations, tokenization may include splitting a stream of data (e.g., a field value of the vendor dataset 202) into separate pieces (e.g., tokens). For example, a whitespace tokenizer may split a field value of a vendor dataset 202 into separate tokens upon encountering whitespace in the field value. In another example, a tokenizer may split a field value into separate tokens upon encountering whitespace or any punctuation in the field value of the vendor dataset 202.

In one implementation, the text analysis operations 304 may additionally or alternatively include one or more character filtering operations 304B to be performed on a vendor dataset 202. Character filtering operations 304B may include removing specific characters from a vendor dataset 202. For example, the characters #, @, and & may be removed from a field value of an ingested dataset 204 using one or more character filtering operations 304B.

In one implementation, the text analysis operations 304 may additionally or alternatively include one or more token filtering operations 304C. Token filtering operations 304C perform adjustments or otherwise transform tokens according to specified criteria. For example, the token filtering operations 304C may perform one or more of converting all text in a token to lowercase, converting all text in a token to uppercase, adjusting a token to support stemming, injecting elements into a token to cover synonyms, and removing elements from tokens, including stop words. In some implementations, multiple token filtering operations 304C may be chained together to form a single token filtering operation 304C.

In one implementation, the analysis operations 300 may additionally or alternatively include one or more data field generation operations 306. Data field generation operations 306 may include combining data from two or more fields of a vendor dataset 202 to generate data for an additional field. This additional field is also defined within the info retrieval system 218. In one example, a "Company Name" field may be combined with a "Company Address" field to generate a "Company Identifier" field. In this example implementation, the "Company Identifier" field may be expressed as {Company Name, Company Address}. Although described as a direct combination of fields, in other implementations, data for an additional field may be generated based on only a portion of an existing field value or based on a function of an existing field value. In some implementations, data for an additional field may be generated using a data field generation operation 306 based on previously generated fields using a data field generation operation 306. For example, the "Company Identifier" field may be combined with a "CEO" field to generate a "Corporate Governance" field.

In one implementation, the analysis operations 300 may additionally or alternatively include one or more indexing operations 308. Indexing operations 308 may include collecting, parsing, and storing data to facilitate efficient record retrieval. Any type of indexing may be performed using the indexing operations 308, including bitmap indexing, dense indexing, sparse indexing, reverse indexing, or any combination thereof.

In one implementation, the analysis operations 300 may additionally or alternatively include a storing operation 310. The storing operation 310 may store a field from the vendor dataset 202 in the analyzed dataset 210. Accordingly, the field stored in the analyzed dataset 210 is raw data from the vendor dataset 202.

In some implementations, the analysis operations 300 may be vendor system 104 specific or vendor specific and may be adjusted while the DAAS system 110, including the analysis service 116, is running. For example, a first text analysis operation 304 may remove all white space from a field. A vendor or administrator of the DAAS system 110 may determine that this first text analysis operation 304 is no longer desirable and may decide to replace this first text analysis operation 304 with a second text analysis operation 304 that removes whitespace only from the beginning and ends of the field. The first text analysis operation 304 may be replaced with the second text analysis operation 304 without recompilation and redistribution of the DAAS system software.

As described above, one or more analysis operations 300 may be combined together to form analysis types. These analysis types may operate on a field in a vendor dataset 202. For example, an analysis type may be comprised of a normalization operation 302 and a indexing operation 308. In this example, normalization may be performed on a field of a vendor dataset 202 (e.g., a "Company Name" field) using the normalization operation 302 and the resulting normalized field may thereafter be indexed using the indexing operation 308. This combination of analysis operations 300 may define an analysis type. Although described as combining two analysis operations 300, in other implementations any number of analysis operations 300 may be combined to form an analysis type.

Figure 4:
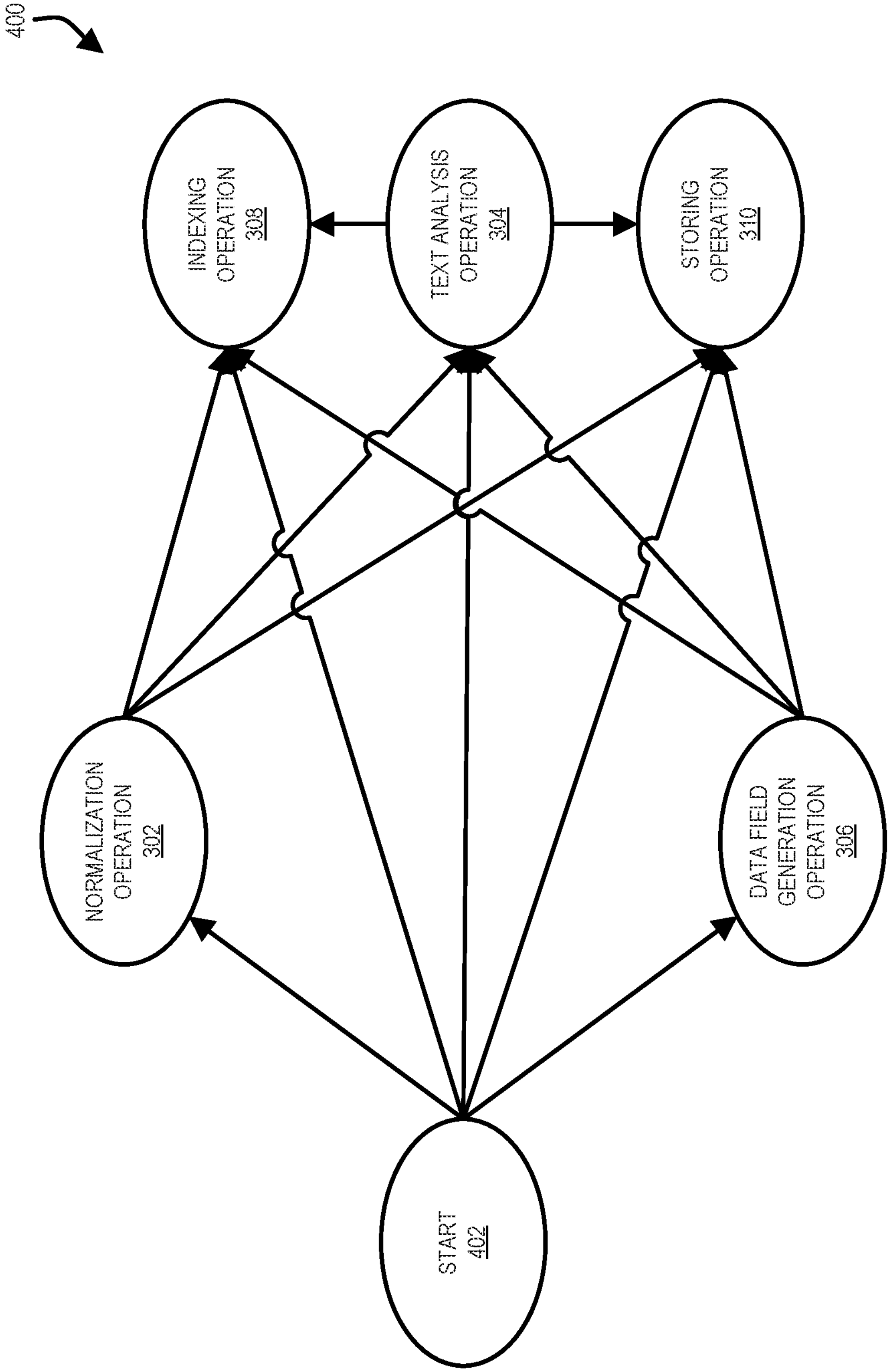
FIG. 4 shows a state machine that represents a data analysis dictionary according to one example implementation.

In one implementation, analysis types may be defined by a data analysis dictionary 212. In this implementation, each analysis type is comprised of a different set of ordered groups of analysis operations 300, which are each performed on a field, as defined by the data analysis dictionary 212. For example, FIG. 4 shows a state machine 400 that represents a data analysis dictionary 212 according to one example implementation. The state machine 400 of FIG. 4 defines a set of available analysis types according to one example implementation. In this example, the state machine 400 includes a set of states, corresponding to analysis operations 300 and a start position (e.g., start 402), and the states are interconnected by a set of directed vertices. Each pass through the state machine 400 (e.g., a pathway through the states via the vertices) defines a separate analysis type based on the ordered group of states or analysis operations 300 in each pathway. In some implementations, a single analysis type may be defined by multiple passes through the state machine 400 using the same field of the vendor dataset 202. Although the data analysis dictionary 212 is represented by a state machine 400 in the example implementation of FIG. 4, in other implementations, different structures may be used for establishing rules and relationships between analysis operations 300 to define analysis types.

As shown, the state machine 400 may begin at the start 402 state with the selection of a field within a given vendor dataset 202. Upon selection of a field, a first analysis operation 300 may be performed. In this example state machine 400, the first analysis operation 300 would either be a normalization operation 302, a text analysis operation 304, a data field generation operation 306, an indexing operation 308, or a storing operation 310. Upon selection of a first analysis operation 300, the state machine 400 indicates whether another analysis operation 300 is necessary or whether the analysis is complete. This relationship between analysis operations 300 is shown by vertices between states in the state machine 400. For example, upon selection of a normalization operation 302, the state machine 400 indicates that either a text analysis operation 304, an indexing operation 308, or a storing operation 310 must be performed. This is indicated by vertices pointing from the normalization operation 302 state to each of the text analysis operation 304 state, the indexing operation 308 state, and the storing operation 310 state.

Figure 5:
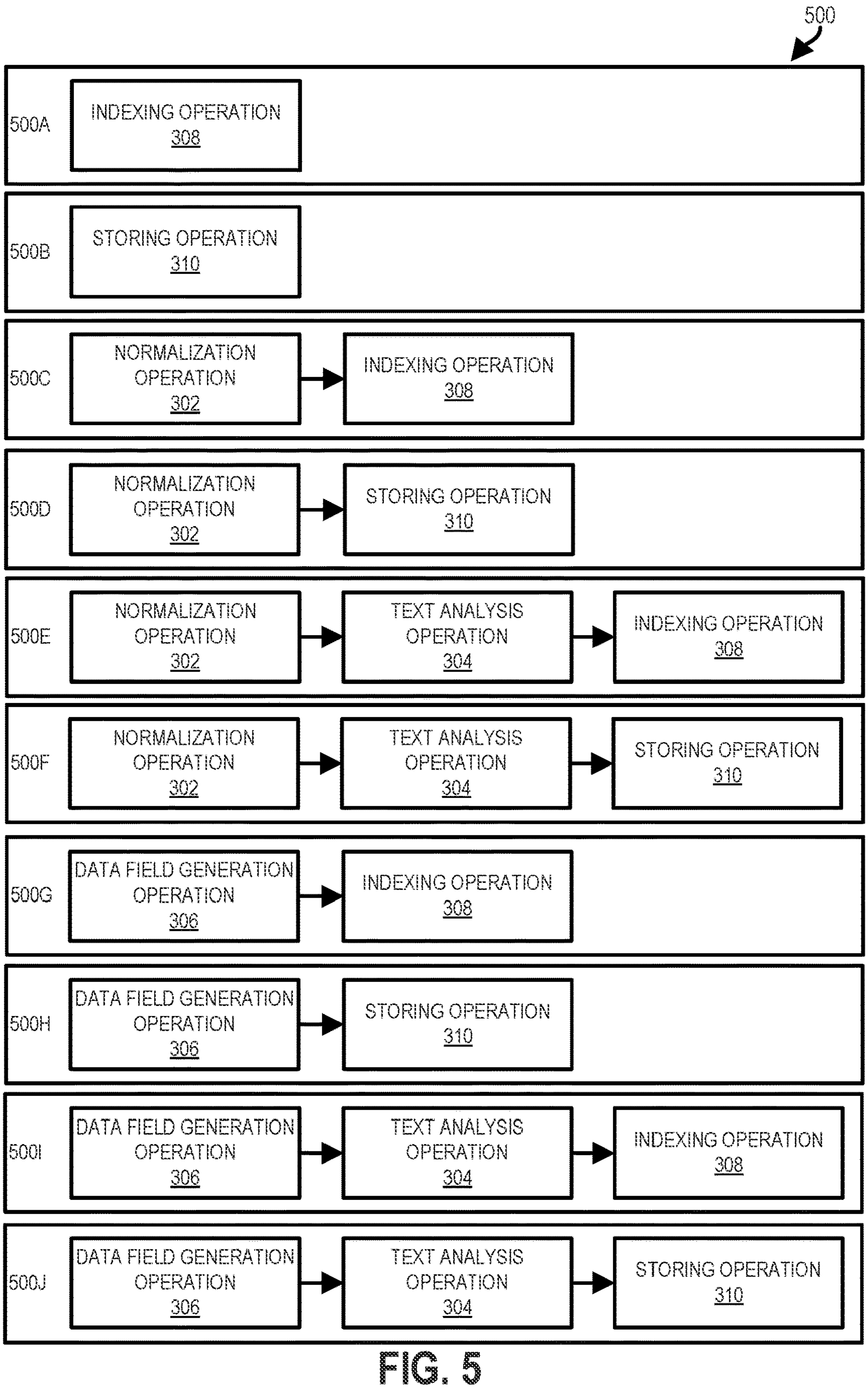
FIG. 5 shows a set of analysis types defined according to the state machine in one example implementation.

FIG. 5 shows a set of analysis types 500 defined according to a single pass through the state machine 400 of FIG. 4 in one example implementation. Although not shown in FIG. 5, each of the analysis types 500A-500J are performed after selection of a field (e.g., at start 402) of the vendor dataset 202 upon which the corresponding analysis type 500 will operate. In some implementations, selection of a field may be considered an analysis operation 300.

Each of the analysis types 500 may be associated with an identifier. For example, an analysis type 500 may be associated with the identifier "knownNormalizedStemFacetText." This analysis type 500 may specify an ordered set of one or more analysis operations 300. The search metadata 214 may use this identifier (e.g., knownNormalizedStemFacetText) to reference the associated analysis type 500 instead of referencing the analysis operations 300 individually and in the corresponding order. Accordingly, analysis types 500 provide a more efficient way of referencing analysis operations 300 by allowing a reference to an analysis type 500 for use of an ordered set of analysis operations 300.

Although the data analysis dictionary 212 is represented as a graphical state machine 400, in some implementations the data analysis dictionary 212 may be represented in another form that is more easily parseable by the DAAS system 110. For example, FIG. 6 shows an example of a data analysis dictionary 212 comprising the analysis types 500A-500E according to one example implementation. As shown, the data analysis dictionary 212 of FIG. 6 is represented using XML, however, in other implementations, other data formats or representations may be utilized. In one implementation, a set of APIs, which allow for a data analysis dictionary 212 to be defined by a vendor through a vendor system 104 and/or by a representative of the DAAS system 110, may be provided for defining the analysis types 500. For example, a representative of the DAAS system 110 may include references to an ordered set of analysis operations 300 in the analysis dictionary 212 to define an analysis type 500. Accordingly, the data analysis dictionary 212 defines analysis types 500, which are each separate combinations of analysis operations 300 in a selected order, and the search metadata 214 references these analysis types 500 such that the analysis service 116 performs the analysis types 500 (e.g., the ordered set of analysis operations 300 defined for each respective analysis type 500) on fields as indicated in the search metadata 214. The data analysis dictionary 212 may be received by the DAAS system 110 at run time of the DAAS system 110, including run time of the analysis service 116, such that the DAAS system 110 may be configured to analyze the ingested dataset 204, and in particular the vendor dataset 202 within the ingested dataset 204, using the search metadata 214 based on references in the search metadata 214 to analysis types 500 defined in the data analysis dictionary 212.

In one implementation, data analysis dictionaries 212 may be vendor system 104 and/or vendor specific. Accordingly, each vendor system 104 may have a separate data analysis dictionary 212 indicating separate analysis types 500 that may be used on respective vendor datasets 202. In another implementation, a data analysis dictionary 212 may be used across several or all vendor systems 104 in the DAAS architecture 100. Accordingly, in this implementation, analysis types 500 (also referred to as analyzer types) may be shared across vendor systems 104.

As noted above, in some implementations, the search metadata 214 may be used for referencing analysis types 500, and consequently the analysis operations 300 that comprise each analysis type 500, that are used to process particular fields of a vendor dataset 202 to generate the analyzed dataset 210. Similar to the ingestion metadata 206, the search metadata 214 may be used at run time of the DAAS system 110 for configuring the DAAS system 110, including the analysis service 116. By using the search metadata 214 at run time, the process of analyzing a vendor dataset 202 may be adjusted without a need for recompilation and redistribution of the DAAS system 110 software.

FIG. 7 shows ingestion/search metadata 122, including the ingestion metadata 206 and the search metadata 214, according to one example implementation. As shown in FIG. 7, the ingestion/search metadata 122 may be represented using XML. However, in other implementations, different languages, data structures, or formats may be used for representing the ingestion/search metadata 122. In some implementations, the ingestion/search metadata 122 may be associated with and determined by a vendor and/or a representative of the DAAS system 110 via an API and/or GUI. Accordingly, in these implementations, the ingestion/search metadata 122 for a particular vendor system 104 may be determined by the inputs from a vendor and/or a representative of the DAAS system 110.

Although shown in FIG. 7 as the ingestion metadata 206 and the search metadata 214 being within a unified structure (e.g., the ingestion/search metadata 122), as described above the ingestion metadata 206 and the search metadata 214 may be within separate data structures.

As shown in FIG. 7, a field named "Company Name", which maps to the "COMPANY_NAME" field from the vendor dataset 202, has the "Analyzer4" analysis type 500 applied to it. Although shown in FIG. 7 as applying an analysis type 500 to a single field, similar ingestion/search metadata 122 may be used in the same ingestion/search metadata 122 to apply analysis types 500 to other fields.

In some implementations, the analyzed dataset 210 generated by the analysis service 116 may be stored within the info retrieval system 218. In some implementations, the search service 130 may perform search queries 142 using the analyzed dataset 210 accessed from the info retrieval system 218 to produce a search query result 216A. In these implementations, the analyzed dataset 210 may be used for performing a search query 142. The search query 142 describes particular records within the vendor dataset 202 that a customer would like to import into the customer system 108. For example, a customer may like to import records from the vendor dataset 202 describing business contacts within a customer relation management system of the customer system 108. The search service 130 may locate records in the analyzed dataset 210 that meet criteria within the search query 142 and return the corresponding records from the vendor dataset 202 to the customer system 108 as a search query result 216A. In this implementation, records within the analyzed dataset 210 that meet the criteria of the search query 142 are cross-referenced against the vendor dataset 202 to locate corresponding records in the vendor dataset 202 that are returned to the customer system 108 via the serving interface as the search query results 216A.

In some implementations, the index service 118 may index the ingested dataset 204, and in particular the vendor dataset 202 within the ingested dataset 204, based on match metadata 146 to support performing a match query 144 by the match service 140. In these implementations, the index service 118 may receive the match key metadata 124 to generate a set of match keys upon which the vendor dataset 202 will be indexed to generate the indexed dataset 220.

Figure 8:
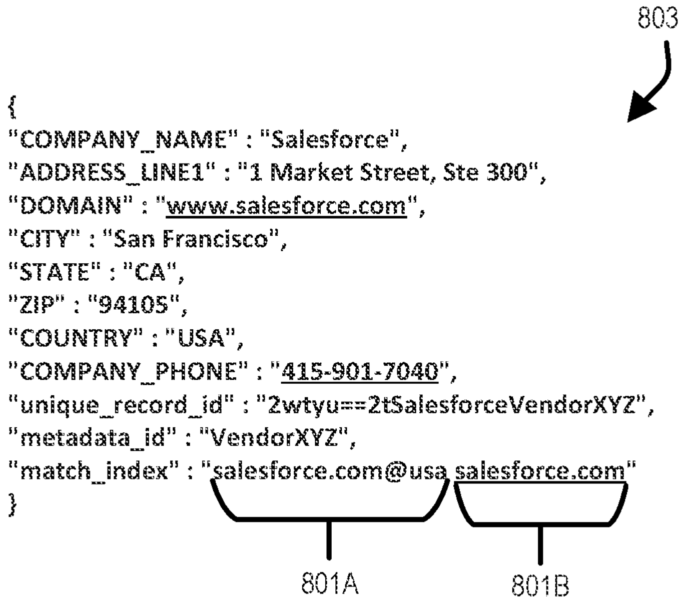
FIG. 8 shows two match keys for a record in an indexed dataset according to one example implementation.

Match keys are combinations of two or more fields or individual fields used by the vendor dataset 202. For instance, if the vendor dataset 202 includes a Company Name field, a Country field, a Phone Number field, and a Domain field, then one match key may be a combination of values of the Domain field and the Country field. For example, a match key may be the concatenation of a Domain field value with a Country field value for each record in the vendor dataset 202. FIG. 8 shows two match keys 801A and 801B for a record 803 in the vendor dataset 202 according to one example implementation. The match key 801A is the combination of the Domain field and the Country field while the match key 801B is only the Domain field for the record 803.

As noted above, match keys are generated by the index service 118 for each record in the vendor dataset 202. Based on one or more of these generated match keys, the vendor dataset 202 may be indexed by the index service 118 to generate the indexed dataset 220.

In one implementation, the set of match keys used to index the vendor dataset 202 are defined in match key metadata 124. FIG. 9 shows an example of match key metadata 124 according to one example implementation. As shown, the match key metadata 124 may be represented using XML. FIG. 9 shows examples of match key definition 901A and match key definition 901B. The match key definition 901A is named "DOMAIN_COUNTRY" and corresponds to the match key 801A and the match key definition 901B is named "DOMAIN" and corresponds to the match key 801B. Throughout this description, match key may be used synonymously with match index. The match key metadata 124 may be used to configure the indexing performed by the index service 118 during run time of the DAAS system 110, including at run time of the index service 118. Since the match key metadata 124 may be used at run time to configure the DAAS system 110, recompilation and/or redistribution of the DAAS system software and/or the index service 118 is not necessary.

In some implementations, one or more operations may be performed on a field prior to generating a match key. For example, as shown in FIG. 9 for the match key definition 901A, an IndexDomainNormalizer may be performed on the Domain field and the PlainNormalizer may be performed on the Country field. For the match key definition 901B, the IndexDomainNormalizer may be performed on the Domain field. Normalizers may help in identifying the main component of the field. For instance, the IndexDomainNormalizer, removes the beginning protocol "http://www." and returns the main or remaining portions of the Uniform Resource Locator (URL) value. In one implementation, a phonetic index normalizer may be used to assist in retrieving similar sounding company names (e.g., Printronics and Printronix normalizers). Although described as using normalizers, in other implementations, other operations may be performed on a field prior to generation of match keys.

Match key metadata 124 may be based on inputs from one or more administrators of the DAAS system 110 and/or from a vendor of a vendor system 104. In some implementations, match key metadata 124 may be vendor system 104 or vendor specific.

The indexed dataset 220 generated by the index service 118 may be stored in the info retrieval system 218 such that a match service 140 may perform a match query 144 using the indexed dataset 220 retrieved from the info retrieval system 218 to update records previously imported by a customer system 108. For example, a customer system 108 may include a customer relationship management system. A customer using the customer system 108 may be reviewing a set of records previously imported from the DAAS system 110 (e.g., using the search service 130). The customer relationship management system may include an interface that allows the customer to trigger the update of records in the customer relationship management system that were previously imported from the DAAS system 110. Triggering this update causes the customer relationship management system to generate and transmit a match query 144 to the DAAS system 110. In response to the match query 144, the match service 140 may produce a match query result 216B that includes records to be imported by the customer system 108. The customer system 108 may use the records in the match query result 216B to update previously imported records stores within the customer system 108.

Figure 10:
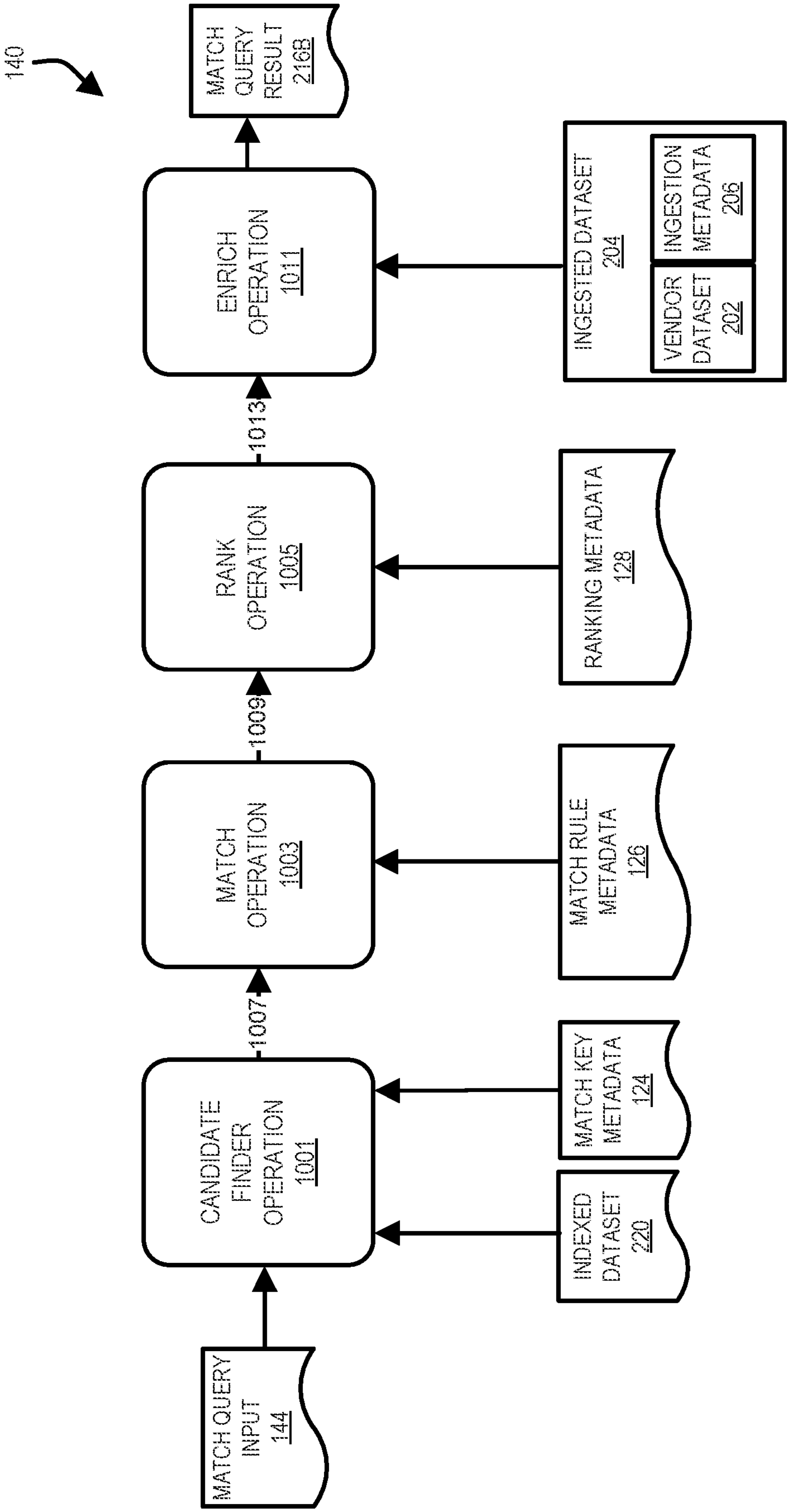
FIG. 10 shows a detailed block diagram of a match service according to one example implementation.

FIG. 10 shows a detailed block diagram of the match service 140 according to one example implementation. As shown in FIG. 10, the match service 140 may include four operations: a candidate finder operation 1001, a matching operation 1003, a ranking operation 1005, and an enrich operation 1011. For each match query 144 performed by the match service 140, the match service 140 may produce a match query result 216B that is provided to a corresponding customer system 108 and customer that requested the match query 144 to be performed. In some implementations, the match service 140 may utilize one or more of match key metadata 124 for configuration of the candidate finder operation 1001, match rule metadata 126 for configuration of the matching operation 1003, and ranking metadata 128 for configuration of the ranking operation 1005. The match key metadata 124, the match rule metadata 126, and/or the ranking metadata 128 may be used to configure the match querying performed by the DAAS system 110 during run time of the DAAS system 110, including at run time of the match service 140. Since the match key metadata 124, the match rule metadata 126, and/or the ranking metadata 128 may be used at run time to configure the DAAS system 110, recompilation and/or redistribution of the DAAS system software and/or the match service 140 is not necessary.

As noted above, the match service 140 may include a candidate finder operation 1001. The candidate finder operation 1001 may operate on a match query 144 and an indexed dataset 220 stored in the info retrieval system 218. As noted above, the match query 144 may be received from a customer system 108 and may be associated with a customer. The match query 144 may describe criteria of a query to be performed by the match service 140. For example, the match query 140 may include a set of values for a set of fields that are defined in the DAAS system 110. For instance, if the DAAS system 110 defines a Company Name field, a Country field, a Phone Number field, and a Domain field, and these fields of different data records were populated with values identified for those fields in the vendor dataset 202 (amongst potentially other fields also defined in the DAAS system 110), a match query 144 may include values for the Company Name field, the Country field, the Phone Number field, and the Domain field. For instance, in the above example, a customer is seeking records in the vendor dataset 202 that have values in the Company Name field, the Country field, the Phone Number field, and the Domain field that match corresponding values in the match query 144.

For a given match query 140, the candidate finder operation 1001 determines a set of candidate records 1007 from the indexed dataset 220. The candidate records 1007 are a subset of the records in the indexed dataset 220. In one implementation, the determination of candidate records 1007 from the indexed dataset 220 is based on a set of match keys that are generated by the candidate finder operation 1001 for the match query 220 and were previously generated by the index service 118 for the vendor dataset 202 (e.g., the index service 118 generated the indexed dataset 220 that includes the match keys for the vendor dataset 202). As noted above, match keys are combinations of two or more fields or individual fields. The match keys generated by the candidate finder operation 1001 for the match query 144 are based on the same fields as those used by the index service 118 to generate the indexed dataset 220. Accordingly, the candidate finder operation 1001 uses the match key metadata 124 to generate match keys for the match query 144. Records from the indexed dataset 220 that have match keys that match with match keys of the match query 144 are determined to be candidate records 1007. For instance, for the example in FIG. 8, if a match query 144 includes a first match key with the value "salesforce.com@usa" and a second match key with the value "salesforce.com", the record 803 of FIG. 8 matches with the match query 144 and the record 803 is determined to be a candidate record 1007.

Through the use of the candidate finder operation 1001, the candidate records 1007 are determined. Although the candidate finder operation 1001 narrows down the list of possible records that will match with the match query 144, the candidate records 1007 determined by the candidate finder operation 1001 may still contain records that do not match the match query 144. To correct this issue, the matching operation 1003 eliminates non-matching records from the candidate records 1007 to produce the matched records 1009.

In one implementation, the matching operation 1003 may apply a set of match rules to the candidate records 1007 to determine matched records 1009 from the candidate records 107 (i.e., the matched records 1009 are those records of the candidate records 807 that match the fields of the match query 144 using a set of methods and/or thresholds). A match rule may be an equation composed of one or more logical operations and zero or more operators. Each logical operation compares a field in the candidate records 1007 with the same field in the match query 144 to determine a logical value (e.g., a Boolean value).

Figure 11:
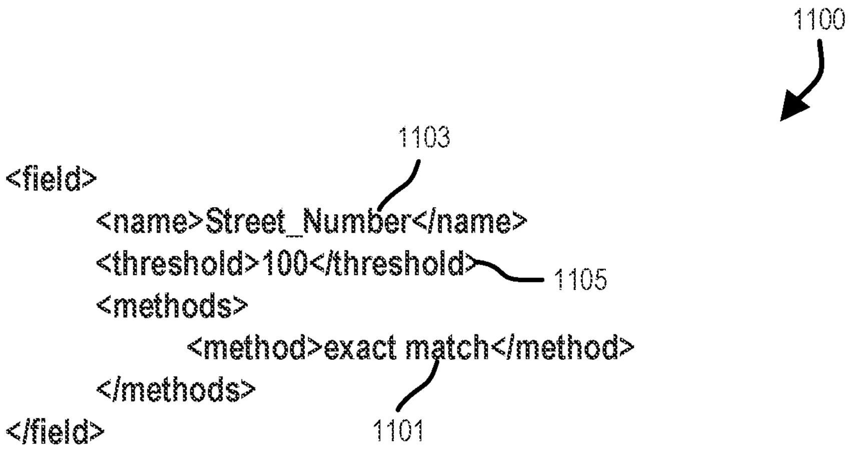
FIG. 11 shows an example of a logical operation defined in metadata according to one example implementation.

In one implementation, the set of match rules, including the one or more logical operations, may be defined using metadata. FIG. 11 shows an example of a logical operation 1100 defined in metadata (e.g., XML) according to one example implementation. As shown, the logical operation 1100 uses an exact match method 1101 to perform a comparison using the Street Number field 1103. The exact match method 1101 returns a match score of "100" when an exact match is determined being a record in the candidate records 1007 and a match query 144. Otherwise, a match score of "0" is returned when any other level of match is determined. The match score returned by the exact match method 1101 is compared against the threshold 1105 to determine a logical value for the logical operation 1100. Since the exact match method 1101 is used for the logical operation 1100, the threshold 1105 is set to "100", indicating that only a "100" or "100%" match score will cause the logical operation 1100 to return a "true" logical value. Otherwise, the logical operation 1100 returns a "false" logical value for any other match score.

Figure 12:
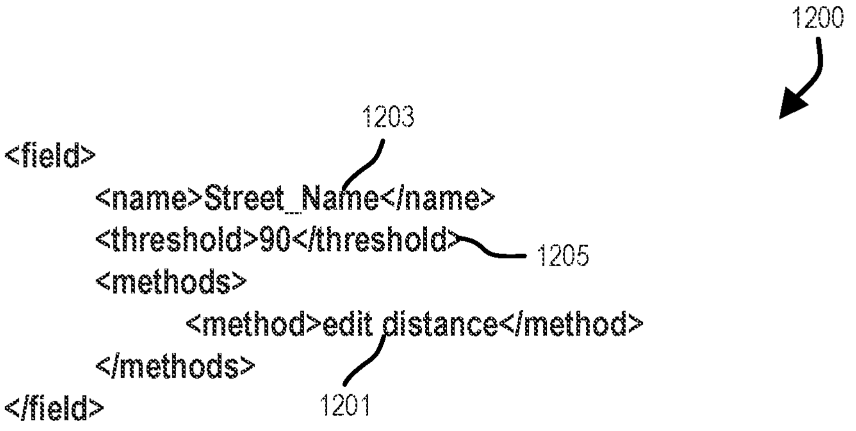
FIG. 12 shows a logical operation defined in metadata according to another example implementation.

FIG. 12 shows a logical operation 1200 defined in metadata (e.g., XML) according to another example implementation. As shown, the logical operation 1200 uses an edit distance method 1201 to perform a comparison using the Street Name field 1203. The edit distance method 1201 determines the similarity between two strings based on the number of deletions, insertions, and character replacements needed to transform one string into the other. Based on the similarity between the Street Name field 1203 of a record in the candidate records 1007 and the match query 144, the edit distance method 1201 returns a match score reflective of this similarity. For example, a high similarity would return a high match score (e.g., "98" or "98%) while a low similarity would return a low match score (e.g., "30" or "30%"). The match score returned by the edit distance method 1201 is compared against the threshold 1205 to determine a logical value for the logical operation 1200. In the example of FIG. 12, the threshold is set to "90", indicating that only a match score of "95" or greater will cause the logical operation 1200 to return a "true" logical value. Otherwise, the logical operation 1200 returns a "false" logical value for a match score less than "95."

Figure 13:
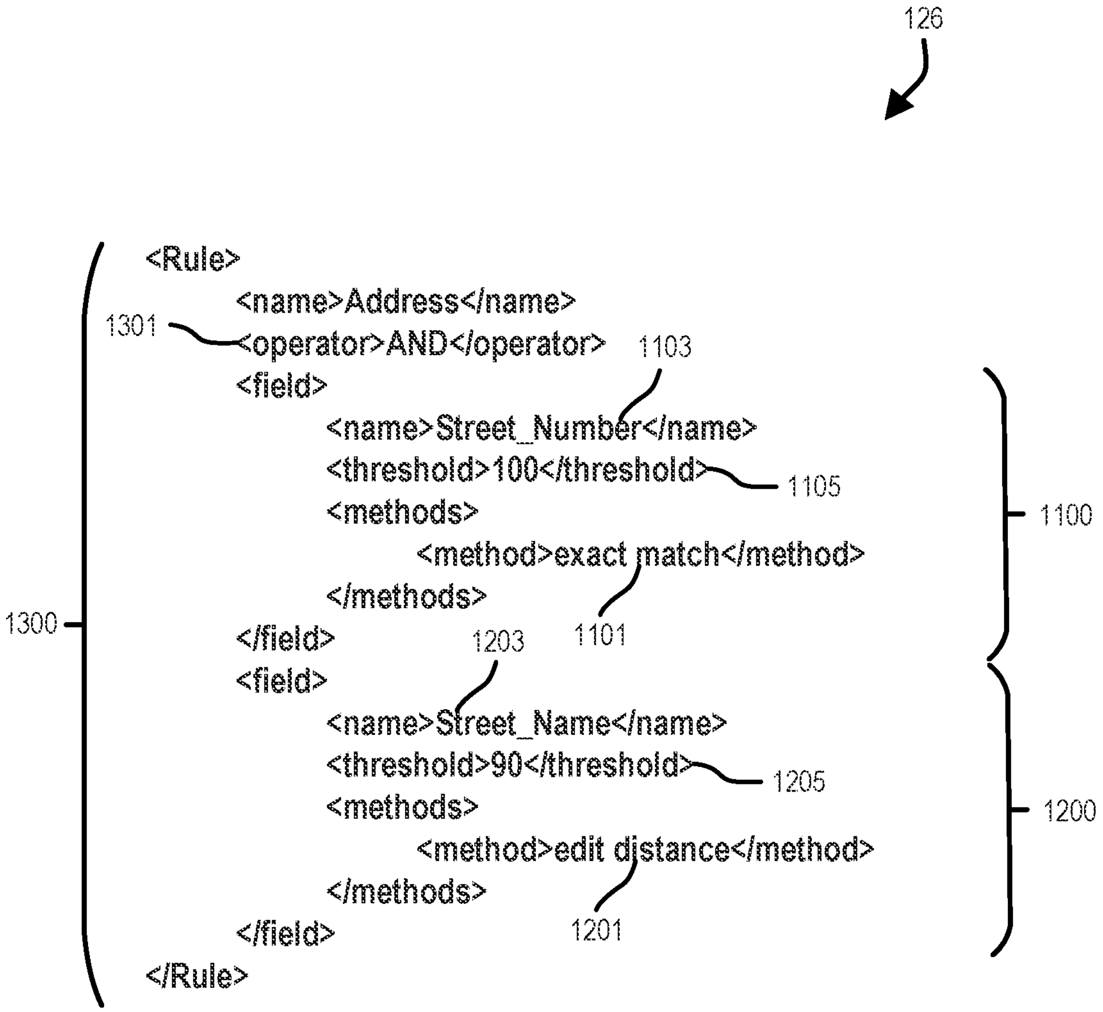
FIG. 13 shows a match rule defined in the match rule metadata according to one example implementation.

As noted above, a match rule may be a composed of one or more logical operations and zero or more operators. FIG. 13 shows a match rule 1300 defined in the match rule metadata 126 according to one example implementation. As shown, the match rule 1300 is composed of the logical operation 1100, the logical operation 1200, and the logical operator 1301 (i.e., the AND operator). In this example, the logical operator 1301 (e.g., the AND operation) is applied using the logical value returned from the logical operation 1100 and the logical value returned form the logical operation 1200. When both the logical operation 1100 and the logical operation 1200 return "true" for a record in the candidate records 1007, the match rule 1300 returns "true" and the record is included in the matched records 1009 by the matching operation 1003. Otherwise, the record is excluded from the matched records 1009 by the matching operation 1003.

As noted above, match rules may be defined in the match rule metadata 126 and the match rule metadata 126 may include one or more match rules. The match rule metadata 126 may be used at run time of the DAAS system 110, including the match service 140, for configuration of the DAAS system 110, including the match service 140. By using the match rule metadata 126 at run time, match rules may be adjusted without a need for recompilation and redistribution of the DAAS system software, including the match service 140.

Following determining the matched records 1009, the ranking operation 1005 may rank the matched records 1009. In one implementation, the matched records 1009 are ranked based on weights applied to match scores determined during the matching operation 1003. For example, the exact match method 1101 may return a match score of "100" and the edit distance method 1201 may return a match score of "96" for a particular record in the matched records 1009. In this example, the ranking operation 1005 may apply a first weight to the match score returned by the exact match method 1101 and a second weight to the match score returned by the edit distance method 1201 to produce a set of weighted scores. In one implementation, application of a weight to a match score may be performed through multiplication (e.g., weight*match score). The weighted scores may be summed or averaged together to compute a matching score for the record.

The matching score computed for each record in the matched records 1009 may be used for ranking the matched records 1009 to generate a set of ranked records 1013. For example, the matched records 1009 may be ranked from highest to lowest (e.g., decreasing order) based on the final score of each record in the matched records 1009 to generate the ranked set of records 1013. In one implementation, the ranked set of records 1013 is a subset of the matched records 1009. For example, only the records in the matched records 1009 with the highest matching score is in the ranked set of records 1013. In another example, only the top three records in the matched records 1009 with the three highest matching scores are in the ranked set of records 1013.

In one implementation, the weights used to generate the weighted scores and ultimately the matching scores may be defined using the ranking metadata 128. For example, FIG. 14 shows ranking metadata 128 according to one example implementation. In this example, field names are used to reference match scores returned by corresponding methods. For example, the field name "Street Name" is used to reference the match score returned by the exact match method 1101 of the logical operation 1100 and the field name "Street Number" is used to reference the match score returned by edit distance method 1201 of the logical operation 1200. A separate weight that is indicated in the ranking metadata 128 for each match score. For example, as shown in FIG. 14, a weight of "100" is indicated for the match score returned by the method operating on the Street Number field and a weight of "1000" is indicated for the match score returned by the method operating on the Street Name field.

In one implementation, the ranking operation 1005 may also compute a non-matching score for each record in the matched records 1009. In this implementation, fields that are not a basis for matching (i.e., non-matching fields) may be associated with non-matching weights. For example, fields that are not defined in the DAAS 110 but are within a vendor dataset 202 may include operations and corresponding weights to compute a non-matching score. For instance, the ranking metadata 128 includes an "isHQ" operation that determines whether a corresponding record in the matched records 1009 corresponds to a headquarter office. Similarly, the ranking metadata 128 includes an "isBranch" operation that determines whether a corresponding record in the matched records 1009 corresponds to a branch office. When a record in the match records 1009 is a headquarter office, the corresponding weight indicated in the ranking metadata 128 may be selected for use. Conversely, when a record in the match records 1009 is a branch office, the corresponding weight indicated in the ranking metadata 128 may be selected for use. The weights of non-matching fields that are selected for use may be summed together to compute a non-matching score for each record in the matched records 1009.

In one implementation, a score ratio may be applied to the matching score and/or the non-matching score for each record in the matched records 1009. For example, the ranking metadata 128 may indicate a score ratio of 0.75. In this example, the final score for each record may be computed as the sum of the matching score multiplied by 0.75 (e.g., the score ratio) and the non-matching score multiplied by 0.25 (e.g., 1−score ratio). This final score may be used by the ranking operation 1005 for ranking the records in the matched records 1009 to generate the ranked set of records 1013.

As described above, weights used to generate the weighted scores may be defined by the ranking metadata 128. The ranking metadata 128 may be used by the DAAS system 110, including the match service 140, at run time to configure the DAAS system 110, including the match service 140. By using the ranking metadata 128 at run time, weights may be adjusted without a need for recompilation and redistribution of the DAAS system 110 software, including the match service 140.

The ranked set of records 1013 may be compared with the ingested dataset 204 by the enrich operation 1011, and in particular the vendor dataset 202, to determine records in the vendor dataset 202 that match with records in the ranked set of records 1013 (e.g., using a primary identifier in each of the ranked set of records 1013 and the vendor dataset 202). These matching records in the vendor dataset 202 may be returned to the customer system 108 as the match query result 216B.

Figure 15:
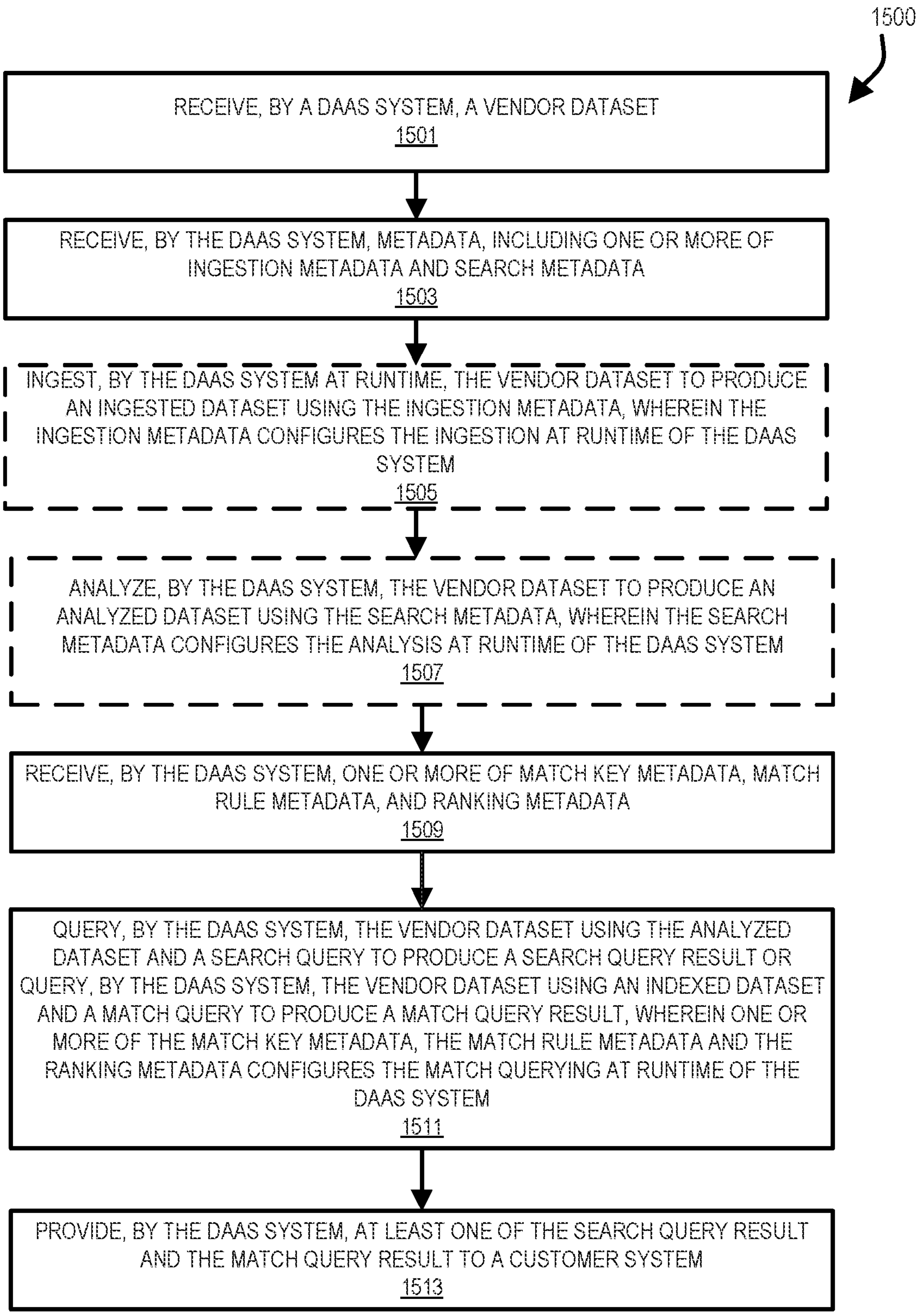
FIG. 15 shows a method according to one example implementation for enabling the configuration of at least one of how to ingest a vendor dataset to produce an ingested dataset, which analysis operations to perform on a vendor dataset and which match keys, match rules, and/or weights to use on an ingested dataset responsive to ingestion/search metadata and match metadata, including match key metadata, match rule metadata, and/or ranking metadata during runtime of the DAAS system as opposed to recompilation and redistribution of the DAAS system.

Turning now to FIG. 15, a method 1500, according to one example implementation, will be described for enabling the configuration of at least one of how to ingest a vendor dataset 202 to produce an ingested dataset 204, which analysis operations 300 to perform on a vendor dataset 202, and which match keys, match rules, and/or weights to use on a vendor dataset 202 responsive to ingestion/search metadata 122 and match metadata 146, including match key metadata 124, match rule metadata 126, and/or ranking metadata 128, during runtime of the DAAS system 110 as opposed to recompilation and redistribution of the DAAS system software. Using one or more of ingestion/search metadata 122, match key metadata 124, match rule metadata 126, and ranking metadata 128, the method 1500 may produce a more accurate query result 216 for customer systems 108 with minimum interruption to the DAAS system 110 (e.g., without recompiling and redistributing the DAAS system 110 software).

The operations in the flow diagram of FIG. 15 will be described with reference to the exemplary implementations of the other figures. However, it should be understood that the operations of the flow diagram can be performed by implementations other than those discussed with reference to the other figures, and the implementations discussed with reference to these other figures can perform operations different than those discussed with reference to the flow diagrams. Although described and shown in FIG. 15 in a particular order, the operations of the method 1500 are not restricted to this order. For example, one or more of the operations of the method 1500 may be performed in a different order or in partially or fully overlapping time periods. Accordingly, the description and depiction of the method 1500 is for illustrative purposes and is not intended to restrict to a particular implementation.

In some implementations, one or more of the operations of the method 1500 may be performed by components of the DAAS architecture 100. For example, one or more of the operations of the method 1500 may be performed by one or more of the vendors systems 104, the customer systems 108, and/or the DAAS system 110. In particular, the ingestion service 112, the analysis service 116, the index service 118, the search service 130, and/or the match service 140 may work in conjunction with the vendor systems 104 and the customer systems 108 to perform the operations of the method 1500.

In one implementation, the method 1500 may commence at operation 1501 with receipt by the DAAS system 110 of a vendor dataset 202 representing data of a vendor system 104 and a vendor to be made accessible to a customer system 108 and to a customer via the customer system 108 of the DAAS system 110. In some implementations, the vendor dataset 202 may be received from a vendor system 104 via the ingestion interface 114. This receipt of the vendor dataset 202 may be different in different implementations, such as a vendor system 104 pushing the vendor dataset 202 to the DAAS system 110 and/or the DAAS system 110 accessing the vendor dataset 202 (e.g., via FTP, NFS, or a similar protocol/system).

At operation 1503, the DAAS system 110 may receive the ingestion/search metadata 122 that represents configuration information for a specific vendor dataset 202, vendor datasets 202 of a specific vendor system 104, or vendor datasets of a specific vendor. This receipt of the ingestion/search metadata 122 may be different in different implementations, such as a vendor system 104 pushing the ingestion/search metadata 122 to the DAAS system 110 and/or the DAAS system 110 accessing the ingestion/search metadata 122 (e.g., via FTP, NFS, or a similar protocol/system). In some implementations, the ingestion metadata 206 and the search metadata 214 may be within a single data structure within the ingestion/search metadata 214. In these implementations, the ingestion metadata 206 and the search metadata 214 may be received by the DAAS system 110 at the same time. When the ingestion metadata 206 and the search metadata 214 are defined in separate data structures, the ingestion metadata 206 and the search metadata 214 may be received by the DAAS system 110 at different times. In some implementations, the ingestion/search metadata 122 may be received during run time of the DAAS system 110 and may be used by the DAAS system 110 at run time to configure ingestion of the vendor dataset 202 to produce an ingested dataset 204. In some implementations, the ingestion/search metadata 122 may be received during run time of the DAAS system 110 and may be used by the DAAS system 110 at run time to configure analysis of the ingested dataset 204, and in particular the vendor dataset 202 within the ingested dataset 204, to produce an analyzed dataset 210. In some implementations, the ingestion/search metadata 122, including one or more of the ingestion metadata 206 and the search metadata 214, may be received by the DAAS system 110 at the same time as the vendor dataset 202, before the vendor dataset 202, or after the vendor dataset 202.

At operation 1505, the vendor dataset 202 may be ingested using the ingestion/search metadata 122 (e.g., the ingestion metadata 206) to generate an ingested dataset 204. In one implementation, the ingestion service 112 may receive the vendor dataset 202 at operation 1501 and the ingestion/search metadata 122 (e.g., the ingestion metadata 206) at operation 1503. Based on these two inputs, the ingestion service 112 may thereafter ingest the received vendor dataset 202 at operation 1505 at run time of the DAAS system 110, including the ingestion service 112, using the ingestion/search metadata 122 (e.g., the ingestion metadata 206) to produce the ingested dataset 204. For example, the ingestion/search metadata 122 (e.g., the ingestion metadata 206) may be used to configure the ingestion (e.g., the ingestion service 112) at run time of the DAAS system 110 to produce the ingested dataset 204. The ingestion/search metadata 122, when used for ingesting, includes the ingestion metadata 206 that maps one or more fields of the vendor dataset 202 to fields defined within the DAAS system 110 and may be used by the ingestion service 112 to verify that the structure of the vendor dataset 202 (e.g., the set of fields in the vendor dataset 202) complies with a structure agreed on between a vendor of the vendor system 104 providing the vendor dataset 202 to the DAAS system 110 and an administrator of the DAAS system 110. The ingested dataset 204 may include the vendor dataset 202 and the ingestion metadata 206. The ingested dataset 204, including the vendor dataset 202 and the ingestion metadata 206, may be later used by various other components of the DAAS system 110 (e.g., the analysis service 116, the index service 118, the search service 130, and/or the match service 140) for accessing data from the vendor dataset 202.

In one implementation, an ingested dataset 204, and in particular the vendor dataset 202 within the ingested dataset 204, is analyzed by an analysis service 116 using a set of analysis operations 300 that are referenced in the ingestion/search metadata 122 (e.g., the search metadata 214) at operation 1507. These analysis operations 300 place the ingested dataset 204 in a form that will produce a more accurate search query result 216A for the customer systems 108 in comparison to the vendor dataset 202 or the ingested dataset 204 on their own. In one implementation, the ingestion/search metadata 122 (e.g., the search metadata 214) may configure the analysis (e.g., the search service 116) at run time of the DAAS system 110. The ingestion/search metadata 122, when used for the analyzing, includes search metadata 214 that indicates a set of analysis operations to be performed on the ingested dataset 204.

At operation 1509, the DAAS system 110 may receive one or more of the match key metadata 124, the match rule metadata 126, and the ranking metadata 128 corresponding to or otherwise associated with the received vendor dataset 202, specific vendor system 104, or a specific vendor. This receipt of one or more of the match key metadata 124, the match rule metadata 126, and the ranking metadata 128 may be different in different implementations, such as a vendor system 104 pushing the match key metadata 124, the match rule metadata 126, and/or the ranking metadata 128 to the DAAS system 110 and/or the DAAS system 110 accessing the match key metadata 124, the match rule metadata 126, and/or the ranking metadata 128 (e.g., via FTP, NFS, or a similar protocol/system). Two or more of the match key metadata 124, the match rule metadata 126, and the ranking metadata 128 may be received by the DAAS system 110 at different times. In some implementations, one or more of the match key metadata 124, the match rule metadata 126, and/or the ranking metadata 128 may be received during run time of the DAAS system 110 and may be used by the DAAS system 110 at run time to configure the DAAS system 110, including the index service 118 and/or the match service 140. In one implementation, one or more of the match key metadata 124, the match rule metadata 126, and/or the ranking metadata 128 may be used at run time of the DAAS system 110 for configuring match querying performed by the DAAS system 110 on a dataset (e.g., the vendor dataset 202 via an indexed dataset 220). In some implementations, the match key metadata 124, the match rule metadata 126, and/or the ranking metadata 128, may be received by the DAAS system 110 at the same time as one or more of the vendor dataset 202, the ingestion metadata 206, and the search metadata 214, before one or more of the vendor dataset 202, the ingestion metadata 206, and the search metadata 214, or after one or more of the vendor dataset 202, the ingestion metadata 206, and the search metadata 214.

At operation 1511, the DAAS system 110 may either perform (1) a search query 142 on the vendor dataset 202 by using the analyzed dataset 210 to produce a search query result 216A or (2) a match query 144 on the vendor dataset 202 using an indexed dataset 220 to produce a match query result 216A. When performing the match query 144, the DAAS system 110, and in particular the index service 118 and the match service 140, may be configured at run time by one or more of the match key metadata 124, the match rule metadata 126, and the ranking metadata 128 for performing the match query 144 to produce the match query result 216B. The match key metadata 124 may be used for configuring the index service 118 to generate the indexed dataset 220 and the match service 140 (in particular the candidate finder operation 1001), the match rule metadata 126 may be used for configuring the match service 140 (in particular the matching operation 1003), and/or the ranking metadata 128 may be used for configuring the match service 140 (in particular the ranking operation 1005) at run time of the DAAS system 110. At least one of the search query result 216A and/or the match query result 216A may be provided to a corresponding customer system 108 and to a customer via a customer system 108 at operation 1513.

As described above, the method 1500 utilizes the ingestion/search metadata 122 (e.g., the ingestion metadata 206 and/or the search metadata 214), the match key metadata 124, the match rule metadata 126, and/or the ranking metadata 128 to produce a more accurate query result 216. Further, the ingestion/search metadata 122, the match key metadata 124, the match rule metadata 126, and/or the ranking metadata 128 may be used during run time of the DAAS system 110 to configure the DAAS system 110. Accordingly, operation of the DAAS system 110 may be configured and/or reconfigured for a particular vendor system 104 and/or vendor without recompiling and redistributing the DAAS system 110 software. By allowing the DAAS system 110 to remain running while configuring and/or reconfiguring (e.g., configuring and/or reconfiguring the ingestion service 112, the analysis service 116, the index service 118, and/or the match service 140), the method 1500 ensures minimal downtime for the DAAS system 110 while still producing accurate search query results 216A and match query results 216B.

In one implementation, the DAAS system 110 may be realized using a micro-services architecture and/or using big-data technologies to store and process vendor datasets 202 in a timely efficient manner. This enables the DAAS system 110 to host a multitude of data records (e.g., thousand, millions, etc.) and serve these records (e.g., via search query results 216A and match query results 216B) efficiently to customer systems 108.

One or more parts of the above implementations may include software and/or a combination of software and hardware. An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory, phase change memory, and solid state drives (SSDs)) and machine-readable transmission media (also called a carrier) (e.g., electrical, optical, radio, acoustical or another form of propagated signals—such as carrier waves or infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory (with slower read/write times, e.g., magnetic disks, optical disks, read only memory (ROM), flash memory, phase change memory, and SSDs) and volatile memory (e.g., dynamic random access memory (DRAM), static random access memory (SRAM)), where the non-volatile memory persists the code/data even when the electronic device is turned off (when power is removed), and the electronic device copies that part of the code that is to be executed by the processor(s) of that electronic device from the non-volatile memory into the volatile memory of that electronic device during operation because volatile memory typically has faster read/write times. As another example, an electronic device may include a non-volatile memory (e.g., phase change memory) to store the code/data when the electronic device is turned off, and that same non-volatile memory has sufficiently fast read/write times such that, rather than copying the part of the code/data to be executed into volatile memory, the code/data may be provided directly to the processor(s) (e.g., loaded into a cache of the processor(s)); in other words, this non-volatile memory operates as both long-term storage and main memory, and thus the electronic device may have no or only a small amount of DRAM for main memory. Typical electronic devices also include a set of one or more physical network interface(s) to establish network connections (to transmit and/or receive code and/or data using propagating signals) with other electronic devices.

Figure 16:
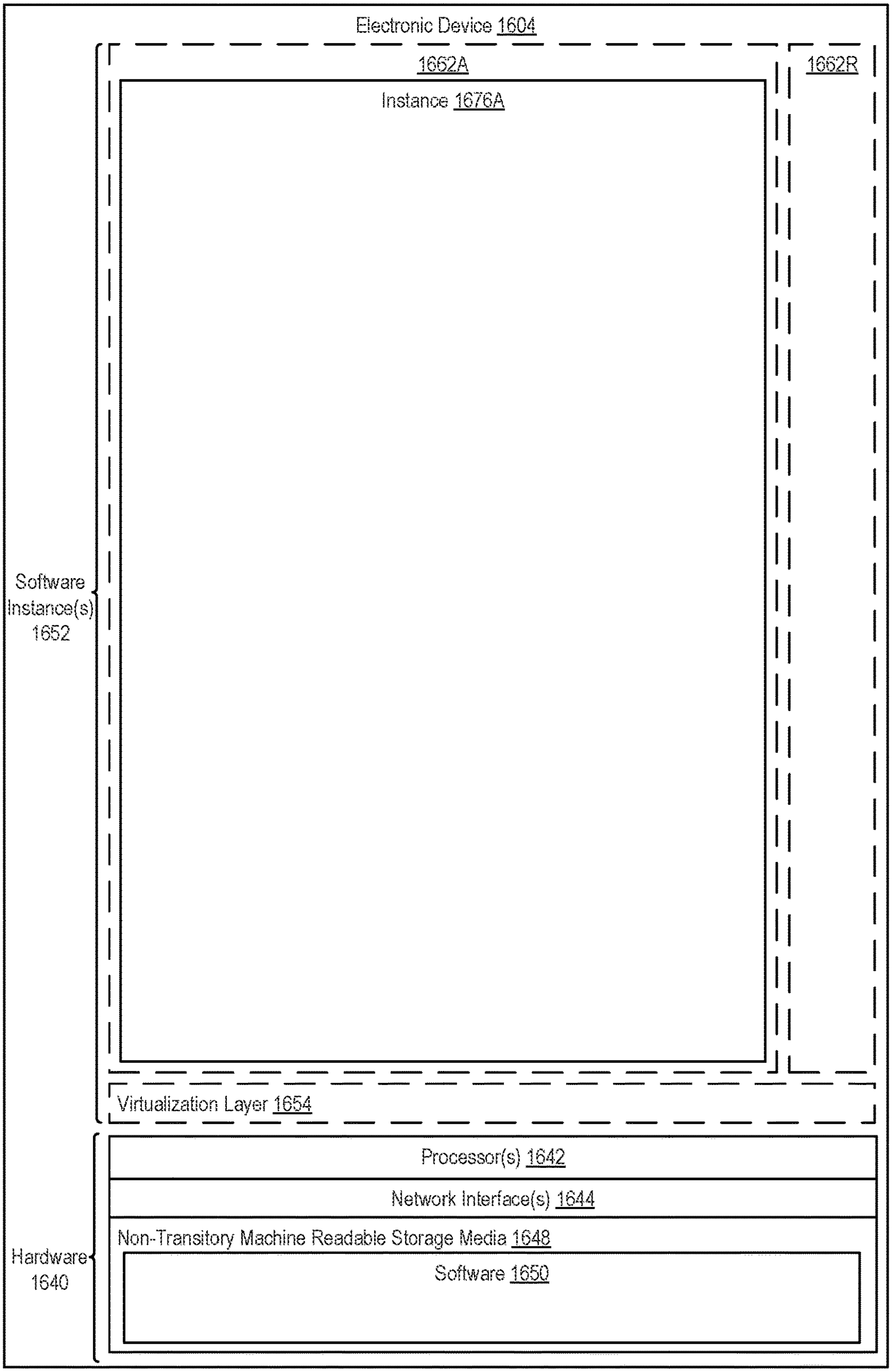
FIG. 16 illustrates an electronic device according to one example implementation.

FIG. 16 illustrates an electronic device 1604 according to one implementation. FIG. 16 includes hardware 1640 comprising a set of one or more processor(s) 1642, a set or one or more network interfaces 1644 (wireless and/or wired), and non-transitory machine-readable storage media 1648 having stored therein software 1650. Each of the previously described vendor systems 104, customer systems 108, and the DAAS system 110 may be implemented in one or more electronic devices 1604. In one implementation, each of the vendor systems 104 and customer systems 108 is implemented in a separate one of the electronic devices 1604 (e.g., in an end user electronic device operated by an end user; in which case, the software 1650 includes those elements necessary to interact with the DAAS system 110 directly or through an intermediate service layer (e.g., an API, a web browser, a native client, a portal, a command-line interface, etc.)). Also, the DAAS system 110 is implemented in a separate set of one or more of the electronic devices 1604 (e.g., in which case, the software 1650 is the DAAS system 110 software, including one of the ingestion service 112, the analysis service 116, index service 118, and the match service 140). In operation, the end user electronic devices and the electronic device(s) implementing the DAAS system 110 would be commutatively coupled (e.g., by a network) and would establish between them (or through one or more other layers (e.g., an intermediary device, which may be implemented in a set of one or more electronic devices that is separate from, overlapping with, or the same as the set of one or more electronic devices on which the DAAS system 110 is implemented (in which case, the software 1650 includes the software to implement the intermediary devices))) connections for submitting vendor datasets 202 and metadata to the DAAS system 110 and returning a search query result. Other configurations of electronic devices may be used in other implementations (e.g., an implementation in which the end user client and the DAAS system 110 are implemented on a single electronic device).

In electronic devices that use compute virtualization, the processor(s) 1642 typically execute software to instantiate a virtualization layer 1654 and software container(s) 1662A-R (e.g., with operating system-level virtualization, the virtualization layer 1654 represents the kernel of an operating system (or a shim executing on a base operating system) that allows for the creation of multiple software containers 1662A-R (representing separate user space instances and also called virtualization engines, virtual private servers, or jails) that may each be used to execute a set of one or more applications. With full virtualization, the virtualization layer 1654 represents a hypervisor (sometimes referred to as a virtual machine monitor (VMM)) or a hypervisor executing on top of a host operating system, and the software containers 1662A-R each represent a tightly isolated form of software container called a virtual machine that is run by the hypervisor and may include a guest operating system. With para-virtualization, an operating system or application running with a virtual machine may be aware of the presence of virtualization for optimization purposes). Again, in electronic devices where compute virtualization is used, during operation an instance of the software 1650 (illustrated as instance 1676A) is executed within the software container 1662A on the virtualization layer 1654. In electronic devices where compute virtualization is not used, the instance 1676A on top of a host operating system is executed on the "bare metal" electronic device 1604. The instantiation of the instance 1676A, as well as the virtualization layer 1654 and software containers 1662A-R if implemented, are collectively referred to as software instance(s) 1652.

Alternative implementations of an electronic device may have numerous variations from that described above. For example, customized hardware and/or accelerators may also be used in an electronic device.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 17:
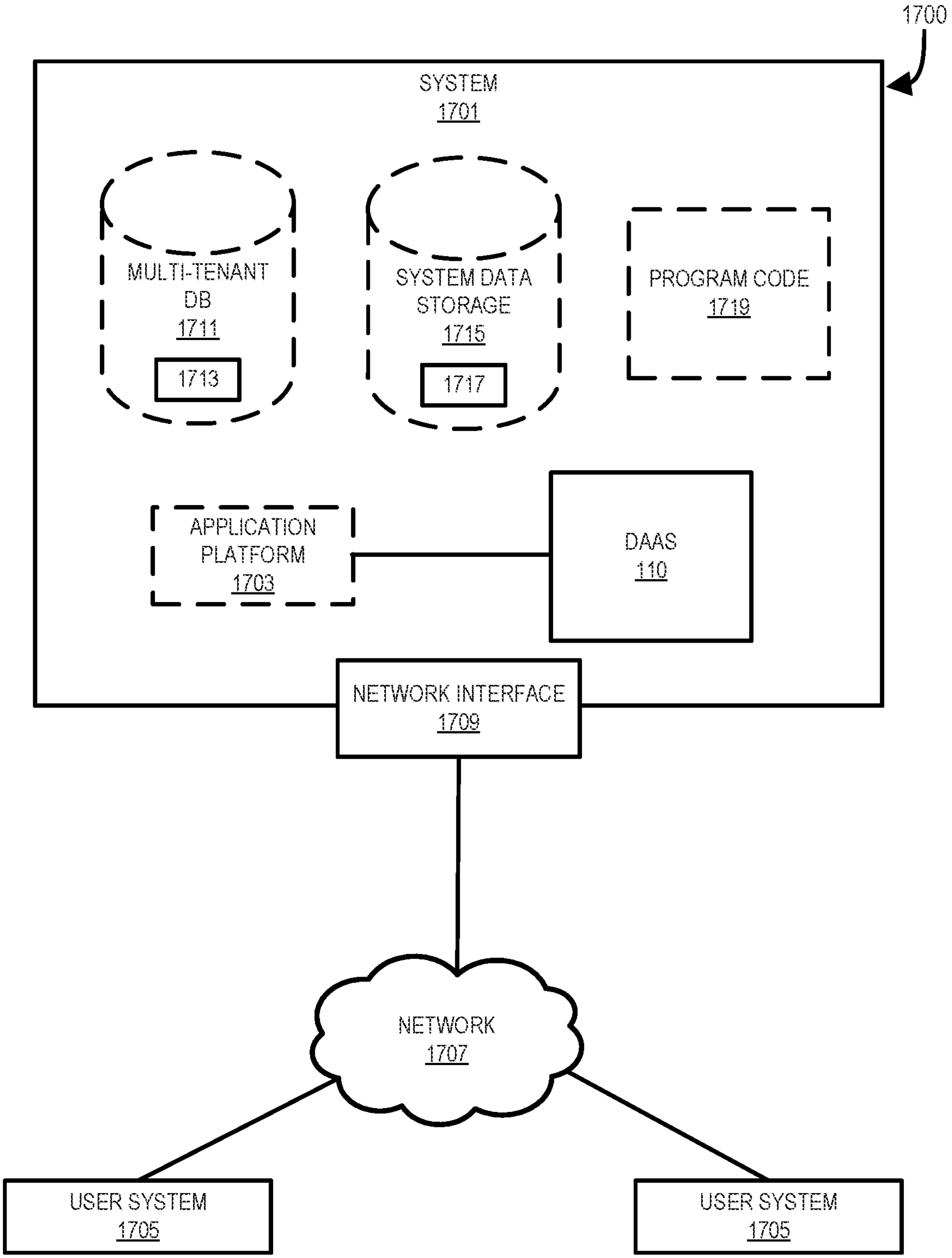
FIG. 17 shows a block diagram of an environment where an on-demand, metadata driven DAAS system may be implemented.

FIG. 17 shows a block diagram of an environment 1700 where an on-demand, metadata driven DAAS may be implemented. An on-demand service is made available to outside users that do not need to necessarily be concerned with building and/or maintaining a system, but instead may be available for their use when the users need the service (e.g., on the demand of the users). A system 1701 includes hardware and software, and comprises the DAAS system 110. Further, in one implementation, the system 1701 is a multi-tenant cloud computing architecture supporting multiple services, such as software as a service (e.g., DAAS, customer relationship management (CRM)), platform as a service (e.g., execution runtime, database, application development tools; such as Force.com®, Heroku™, and Database.com™ by salesforce.com, Inc.), and/or infrastructure as a service (virtual machines, servers, storage). In an implementation, system 1701 may include an application platform 1703 that enables platform as a service for creating, managing and executing one or more applications developed by the provider of the DAAS system 110, users accessing the system 1701 via user systems 1705 (e.g., vendor systems 104 and customer systems 108), or third-party application developers accessing the system 1701 via user systems 1705.

Network 1707 is any network or combination of networks of devices that communicate with one another. For example, network 1707 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in some of the examples herein. However, it should be understood that the networks that the one or more implementations may use are not so limited, although TCP/IP is a frequently implemented protocol.

Each user system 1705 is an end user electronic device, such as a desktop personal computer, workstation, laptop, Personal Digital Assistant (PDA), cell phone, etc. Each user system 1705 also typically includes one or more user interface devices, such as a keyboard, a mouse, a trackball, a touch pad, a touch screen, a pen or the like, for interacting with a graphical user interface (GUI) provided on a display (e.g., a monitor screen, a LCD display, etc.) in conjunction with pages, forms, applications and other information provided by system 1701 or other systems or servers. For example, the user interface device can be used to access data and applications hosted by system 1701, and to perform searches on stored data, and otherwise allow a user to interact with various GUI pages that may be presented to a user. User systems 1705 might communicate with system 1701 using TCP/IP and, at a higher network level, use other Internet protocols to communicate, such as Hypertext Transfer Protocol (HTTP), FTP, Andrew File System (AFS), Wireless Application Protocol (WAP), etc. In an example where HTTP is used, user system 1705 might include an HTTP client commonly referred to as a "browser" for sending and receiving HTTP messages to and from a server at system 1701 allowing a user of user system 1705 to access, process and view information, pages and applications available to it from system 1701 over network 1707. Such a server might be implemented as the sole network interface between system 1701 and network 1707, but other techniques might be used as well or instead. In some implementations, the interface between system 1701 and network 1707 includes load sharing functionality, such as round-robin HTTP request distributors to balance loads and distribute incoming HTTP requests evenly over a plurality of servers. However, other alternative configurations may be used instead.

One arrangement for elements of system 1701 is shown in FIG. 17, including network interface 1709, application platform 1703, multi-tenant database 1711 for tenant data 1713, system data storage 1715 for system data 1717 accessible to system 1701 and possibly multiple tenants, program code 1719 (a runtime engine that materializes application data from metadata; that is, there is a clear separation of the compiled runtime engine (also known as the system kernel), tenant data, and the metadata that describes each application, which make it possible to independently update the system kernel and tenant-specific applications and schemas, with virtually no risk of one affecting the others), and DAAS system 110 for implementing various functions of system 1701.

In one implementation, multi-tenant database 1711 stores user/tenant data and application metadata. For example, a copy of a user's most recently used (MRU) items might be stored. Similarly, a copy of MRU items for an entire organization that is a tenant might be stored. In one implementation, the user/tenant data may include the vendor dataset 202, the ingested dataset 204, the analyzed dataset 210, and the indexed dataset 220, while the application metadata may include the ingestion metadata 206, the search metadata 214, and the match metadata 146, including the match key metadata 124, the match rule metadata 126, and the ranking metadata 128. The tenant data may be stored in various databases, such as one or more Oracle™ databases.

In one implementation, application platform 1703 includes an application setup mechanism that supports application developers' creation and management of applications, which may be saved as metadata by save routines. Invocations to such applications, including the DAAS system 110, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the subscriber making the invocation and executing the metadata as an application in a virtual machine.

In certain implementations, one or more servers of system 1701 is configured to handle requests for any user associated with any organization that is a tenant. Because it is desirable to be able to add and remove servers from the server pool at any time and for any reason, there is preferably no server affinity for a user and/or organization to a specific server. In one implementation, therefore, an interface system implementing a load balancing function (e.g., an F5 Big-IP load balancer) is communicably coupled between the servers of system 1701 and the user systems 1705 to distribute requests to the servers. In one implementation, the load balancer uses a least connections algorithm to route user requests to the servers. Other examples of load balancing algorithms, such as round robin and observed response time, also can be used. For example, in certain implementations, three consecutive requests from the same user could hit three different servers, and three requests from different users could hit the same server. In this manner, system 1701 is multi-tenant, wherein system 1701 handles storage of, and access to, different database objects, data and applications across disparate users and organizations.

In certain implementations, user systems 1705 (which may be client systems) communicate with the servers of system 1701 to request and update system-level and tenant-level data from system 1701 that may require sending one or more queries to multi-tenant database 1711 and/or system data storage 1715. System 1701 (e.g., a server in system 1701) automatically generates one or more Structured Query Language (SQL) statements (e.g., one or more SQL queries) that are designed to access the desired information.

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System," describes systems and methods for creating custom database objects as well as customizing standard database objects in a multi-tenant DBMS. In certain implementations, for example, all data records of a custom database object are stored in a single multi-tenant physical table, which may contain multiple logical database objects per organization. It is transparent to customers that their multiple database objects are in fact stored in one large table or that their data may be stored in the same table as the data of other customers.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the implementations described herein may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While implementations have been described in relation to a metadata expressed in XML, other data structures or languages may be utilized. Therefore, the implementations are not limited to XML. In addition, while implementations have been described in relation to ingestion and analysis being separate operations, alternative implementations could be implemented such that ingestion and analysis are a single service/operation. Such implementations could utilize a single piece/file of metadata.

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for configuring operation of software of a data as a service (DAAS) system during run time, wherein the configuring is in relation to analysis of a vendor dataset, and wherein the configuring also includes how to match records in the vendor dataset with a match query from a customer to provide an updated record to the customer, the method comprising:

receiving, by the DAAS system, the vendor dataset representing data of a vendor to be made accessible to a customer of the DAAS system;

analyzing, by the DAAS system, the vendor dataset to produce an analyzed dataset, wherein search metadata configures the analyzing at run time of the DAAS system, wherein the search metadata represents configuration information of the vendor and indicates a set of analysis operations to be performed on the vendor dataset;

querying, by the DAAS system, the vendor dataset to produce a match query result, wherein the querying is performed based on the match query and at least one of match key metadata, match rule metadata, and ranking metadata that configures the querying at run time of the DAAS system, wherein the match key metadata indicates fields in the vendor dataset to generate one or more match keys for the vendor dataset and the match query to determine one or more candidate records from the vendor dataset, the match rule metadata indicates one or more match rules to apply to the one or more candidate records to determine one or more matched records, and the ranking metadata indicates weights to apply to the matched records to determine the match query result; and providing the match query result to the customer of the DAAS system.

2. The method of claim 1, further comprising:

analyzing, by the DAAS system, the vendor dataset to produce an analyzed dataset, wherein search metadata, which represents configuration information of the vendor, configures the analyzing at run time of the DAAS system, wherein the search metadata represents configuration information of the vendor and indicates a set of analysis operations to be performed on the vendor dataset;

querying, by the DAAS system, the vendor dataset to produce a search query result, wherein the analyzed dataset is used to query the vendor dataset to determine the search query result; and providing the search query result to the customer of the DAAS system.

3. The method of claim 2, wherein the set of analysis operations are indicated in the search metadata through one or more analysis types, wherein each analysis type in the one or more analysis types identifies an ordered set of one or more analysis operations from the set of analysis operations.

4. The method of claim 3, wherein the one or more analysis types are defined in a data analysis dictionary, wherein the data analysis dictionary is a state machine in which each analysis operation in the set of analysis operations is represented by a state in the state machine and the ordered set of one or more analysis operations for each analysis type is defined by a pathway through states in the state machine.

5. The method of claim 2, wherein the set of analysis operations include one or more of a normalization operation, a tokenization operation, a character filtering operation, a token filtering operation, a data field generation operation, an indexing operation, and a storing operation.

6. The method of claim 2, wherein the search metadata and at least one of the match key metadata, the match rule metadata, and the ranking metadata is received at run time of the DAAS system.

7. The method of claim 1, wherein querying the vendor dataset based on the match query comprises:

generating the one or more match keys for each record in the vendor dataset to produce an indexed dataset;

generating the one or more match keys for the match query; and comparing the one or more match keys for each record in the indexed dataset with the one or more match keys generated for the query to determine the one or more candidate records from the indexed dataset.

8. The method of claim 7, wherein querying the vendor dataset based on the match query further comprises:

applying the one or more match rules to the one or more candidate records to determine one or more matched records, wherein each of the one or more match rules include one or more of a method and a threshold;

applying the weights to the one or more matched records to determine a ranked set of records; and comparing records in the ranked set of records to records in the vendor dataset to determine matching records in the vendor dataset, wherein the matching records in the vendor dataset are the match query result.

9. A data as a service (DAAS) system that configures operation of software of the DAAS system during run time, wherein the configuring is in relation to analysis of a vendor dataset, and wherein the configuring also includes how to match records in the vendor dataset with a match query from a customer to provide an updated record to the customer, the DAAS system comprising:

a processor coupled to a non-transitory machine-readable storage medium, the non-transitory machine-readable storage medium storing:

an analysis service to analyze a vendor dataset, which represents data of a vendor to be made accessible to a customer of the DAAS system, to produce an analyzed dataset, wherein search metadata configures the analysis service at run time of the DAAS system, wherein the search metadata represents configuration information of the vendor and indicates a set of analysis operations to be performed on the vendor dataset;

a match service to query the vendor dataset to produce a match query result using at least one of match key metadata, match rule metadata, and ranking metadata to configure the match service at run time of the DAAS system, wherein the match key metadata indicates fields in the vendor dataset to generate one or more match keys for the vendor dataset and the match query to determine one or more candidate records from the vendor dataset, the match rule metadata indicates one or more match rules to apply to the one or more candidate records to determine one or more matched records, and the ranking metadata indicates weights to apply to the matched records to determine the match query result; and a serving interface to provide the match query result to the customer of the DAAS system.

10. The DAAS system of claim 9, wherein the analysis service is further to analyze the vendor dataset to produce an analyzed dataset, wherein search metadata, which represents configuration information of the vendor, configures the analyzing at run time of the DAAS system, wherein the search metadata represents configuration information of the vendor and indicates a set of analysis operations to be performed on the vendor dataset; and wherein the DAAS system further comprises a search service to query the vendor dataset to produce a search query result, wherein the analyzed dataset is used to query the vendor dataset to determine the search query result, and the serving interface is to provide the search query result to the customer of the DAAS system.

11. The DAAS system of claim 10, wherein the set of analysis operations are indicated in the search metadata through one or more analysis types, wherein each analysis type in the one or more analysis types identifies an ordered set of one or more analysis operations from the set of analysis operations.

12. The DAAS system of claim 11, wherein the one or more analysis types are defined in a data analysis dictionary, wherein the data analysis dictionary is a state machine in which each analysis operation in the set of analysis operations is represented by a state in the state machine and the ordered set of one or more analysis operations for each analysis type is defined by a pathway through states in the state machine.

13. The DAAS system of claim 10, wherein the set of analysis operations include one or more of a normalization operation, a tokenization operation, a character filtering operation, a token filtering operation, a data field generation operation, an indexing operation, and a storing operation.

14. The DAAS system of claim 10, wherein the search metadata and at least one of the match key metadata, the match rule metadata, and the ranking metadata is received at run time of the DAAS system.

15. A non-transitory computer-readable storage medium storing instructions which, when executed by a set of one or more processors of an electronic device, cause the electronic device to:

receive a vendor dataset representing data of a vendor to be made accessible to a customer of the electronic device;

analyze the vendor dataset to produce an analyzed dataset, wherein search metadata configures the analyzing at run time of the electronic device, wherein search metadata represents configuration information of the vendor and indicates a set of analysis operations to be performed on the vendor dataset;

query the vendor dataset to produce a match query result, wherein the querying is performed based on a match query and at least one of match key metadata, match rule metadata, and ranking metadata that configures the querying at run time of the electronic device, wherein the match key metadata indicates fields in the vendor dataset to generate one or more match keys for the vendor dataset and the match query to determine one or more candidate records from the vendor dataset, the match rule metadata indicates one or more match rules to apply to the one or more candidate records to determine one or more matched records, and the ranking metadata indicates weights to apply to the matched records to determine the match query result; and provide the match query result to the customer of the electronic device.

16. The non-transitory computer-readable storage medium of claim 15, wherein the instructions further cause the electronic device to:

analyze the vendor dataset to produce an analyzed dataset, wherein search metadata, which represents configuration information of the vendor, configures the analyzing at run time of the DAAS system, wherein the search metadata represents configuration information of the vendor and indicates a set of analysis operations to be performed on the vendor dataset;

query the vendor dataset to produce a search query result, wherein the analyzed dataset is used to query the vendor dataset to determine the search query result; and provide the search query result to the customer of the DAAS system.

17. The non-transitory computer-readable storage medium of claim 16, wherein the set of analysis operations are indicated in the search metadata through one or more analysis types, wherein each analysis type in the one or more analysis types identifies an ordered set of one or more analysis operations from the set of analysis operations.

18. The non-transitory computer-readable storage medium of claim 17, wherein the one or more analysis types are defined in a data analysis dictionary, wherein the data analysis dictionary is a state machine in which each analysis operation in the set of analysis operations is represented by a state in the state machine and the ordered set of one or more analysis operations for each analysis type is defined by a pathway through states in the state machine.

19. The non-transitory computer-readable storage medium of claim 16, wherein the set of analysis operations include one or more of a normalization operation, a tokenization operation, a character filtering operation, a token filtering operation, a data field generation operation, an indexing operation, and a storing operation.

20. The non-transitory computer-readable storage medium of claim 16, wherein the search metadata and at least one of the match key metadata, the match rule metadata, and the ranking metadata is received at run time of the electronic device.

21. The non-transitory computer-readable storage medium of claim 15, wherein querying the vendor dataset based on the match query comprises:

generating the one or more match keys for each record in the vendor dataset to produce an indexed dataset;

generating the one or more match keys for the match query; and comparing the one or more match keys for each record in the indexed dataset with the one or more match keys generated for the query to determine the one or more candidate records from the indexed dataset.

22. The non-transitory computer-readable storage medium of claim 21, wherein querying the vendor dataset based on the match query further comprises:

applying the one or more match rules to the one or more candidate records to determine one or more matched records, wherein each of the one or more match rules include one or more of a method and a threshold;

applying the weights to the one or more matched records to determine a ranked set of records; and comparing records in the ranked set of records to records in the vendor dataset to determine matching records in the vendor dataset, wherein the matching records in the vendor dataset are the match query result.

* * * * *